(12) United States Patent
Czarnecki et al.

(10) Patent No.: US 11,085,904 B2
(45) Date of Patent: Aug. 10, 2021

(54) COLUMN HAVING A COMPRESSION-LIMITED ASSEMBLY

(71) Applicant: IDEX Health & Science LLC, Oak Harbor, WA (US)

(72) Inventors: Daniel J. Czarnecki, Southington, CT (US); Nathaniel Nienhuis, Coupeville, WA (US); Eric Beemer, Anacortes, WA (US); David Steckman, Coupeville, WA (US); David Medeiros, Bridgewater, MA (US); Donald W. Pein, Oak Harbor, WA (US)

(73) Assignee: IDEX HEALTH AND SCIENCE LLC, Oak Harbor, WA (US)

( * ) Notice: Subject to any disclaimer, the term of this patent is extended or adjusted under 35 U.S.C. 154(b) by 38 days.

(21) Appl. No.: 16/146,971

(22) Filed: Sep. 28, 2018

(65) Prior Publication Data
US 2020/0103379 A1    Apr. 2, 2020

(51) Int. Cl.
*G01N 30/60* (2006.01)
*G01N 30/20* (2006.01)
*G01N 30/22* (2006.01)
*G01N 30/86* (2006.01)
G01N 30/02 (2006.01)

(52) U.S. Cl.
CPC ........... *G01N 30/603* (2013.01); *G01N 30/20* (2013.01); *G01N 30/22* (2013.01); *G01N 30/606* (2013.01); *G01N 30/6026* (2013.01); *G01N 30/6047* (2013.01); *G01N 30/6095* (2013.01); *G01N 30/8651* (2013.01); *G01N 2030/027* (2013.01)

(58) Field of Classification Search
CPC .......... G01N 30/6004; G01N 30/6026; G01N 2030/6013
See application file for complete search history.

(56) References Cited

U.S. PATENT DOCUMENTS 3,988,225 A * 10/1976 Schulze ................. B01D 15/08
                                              205/771
4,245,494 A *  1/1981 Legendre ............... G01N 30/14
                                              73/19.02
4,283,280 A *  8/1981 Brownlee .......... G01N 30/6026
                                              210/198.2

(Continued)

FOREIGN PATENT DOCUMENTS

EP        2564104         3/2013

OTHER PUBLICATIONS

International Search Report; PCT/US18/53786 dated Dec. 10, 2018.

*Primary Examiner* — Ryan B Huang
(74) *Attorney, Agent, or Firm* — Kilpatrick Townsend & Stockton LLP

(57) ABSTRACT

A chromatography column has a column assembly that further includes a column jacket tube and a column liner tube. The column assembly is configured with end fittings that have compression limiting features and are able to withstand very high pressure, such as used in UHPLC, in conjunction with flange portions of the column liner tube that seal the column assembly. The column liner tube may be biocompatible and may have a smooth consistent inner diameter of less than 2 mm, and an inner diameter of 1 mm in particular embodiments. The end fittings for the microtube assembly may ensure durability and reliability by preventing over- or under-tightening.

55 Claims, 9 Drawing Sheets

(56) References Cited

U.S. PATENT DOCUMENTS

| | | |
|---|---|---|
| 5,472,598 A | 12/1995 | Schick |
| 5,525,303 A | 6/1996 | Ford et al. |
| 5,566,987 A | 10/1996 | Mazhar |
| 5,730,943 A | 3/1998 | Ford et al. |
| 5,736,036 A | 4/1998 | Upchurch et al. |
| 6,056,331 A | 5/2000 | Benett et al. |
| 6,095,572 A | 8/2000 | Ford et al. |
| 7,144,502 B2 | 12/2006 | Fermier et al. |
| 7,311,502 B2 | 12/2007 | Gerhardt et al. |
| 8,173,070 B2 | 5/2012 | Gerhardt et al. |
| 8,696,038 B2 | 4/2014 | Nienhuis |
| 9,056,264 B2 | 6/2015 | Hahn et al. |
| 2006/0213824 A1* | 9/2006 | Higgins ............... B01D 15/22 210/198.2 |
| 2011/0094953 A1* | 4/2011 | Doehren ............. G01N 30/603 210/198.2 |
| 2012/0024411 A1* | 2/2012 | Hahn ................. G01N 30/6026 138/109 |
| 2012/0061955 A1 | 3/2012 | Hochgraeber et al. |
| 2013/0043677 A1 | 2/2013 | Gibson |
| 2014/0166562 A1 | 6/2014 | Michienzi et al. |
| 2016/0082435 A1* | 3/2016 | Bunner ............. G01N 30/6095 422/503 |

* cited by examiner

METHOD FOR MANUFACTURING A COLUMN ASSEMBLY — 700-1

710: USE CNC MACHINING TO FORM A METAL COLUMN JACKET TUBE FOR USE AS A CHROMATOGRAPHY COLUMN ENABLED TO SEPARATE MOLECULAR SPECIES IN A MOBILE PHASE AND HAVING A FIRST INNER DIAMETER LESS THAN ABOUT 5 MM, AND INCLUDING A THREADED TUBE PORTION AT AT LEAST ONE END TO THREADINGLY ENGAGE WITH A RETAINER BODY AT THE AT LEAST ONE END, WHERE THE THREADED TUBE PORTION INCLUDES A SHOULDER THAT DETAINS THE COLUMN JACKET TUBE IN THE RETAINER BODY

712: EXTRUDE A POLYMER TUBE COMPRISED OF A BIOCOMPATIBLE POLYMER TO A FIRST OUTER DIAMETER GREATER THAN THE FIRST INNER DIAMETER OF THE COLUMN JACKET TUBE

714: COLD-DRAW THE POLYMER TUBE THROUGH A DIE AT ROOM TEMPERATURE TO REDUCE THE FIRST OUTER DIAMETER TO A SECOND OUTER DIAMETER THAT IS LESS THAN THE FIRST INNER DIAMETER OF THE COLUMN JACKET TUBE, TO CREATE A COLUMN LINER TUBE

716: INSERT THE COLUMN LINER TUBE INTO THE COLUMN JACKET TUBE, WHERE THE COLUMN LINER TUBE EXTENDS BEYOND BOTH ENDS OF THE COLUMN JACKET TUBE

718: SECURE THE COLUMN LINER TUBE IN THE COLUMN JACKET TUBE, WHERE THE COLUMN LINER TUBE IS CONFIGURED TO CYLINDRICALLY COVER THE FIRST INNER DIAMETER OF THE COLUMN JACKET TUBE AND THE COLUMN LINER TUBE HAS A SECOND INNER DIAMETER LESS THAN THE FIRST INNER DIAMETER OF THE COLUMN JACKET TUBE, WHERE THE SECOND INNER DIAMETER DEFINES A COLUMN PASSAGEWAY ENABLED TO RECEIVE A STATIONARY PHASE AND A MOBILE PHASE AND TO ISOLATE AT LEAST THE MOBILE PHASE FROM CONTACT WITH THE COLUMN JACKET TUBE

720: FLARING AT LEAST ONE END OF THE COLUMN LINER TUBE TO FORM A FLANGE PORTION THAT RADIALLY COVERS THE AT LEAST ONE END OF THE COLUMN JACKET TUBE

722

FIG. 7A 700-2 — METHOD FOR MANUFACTURING A COLUMN ASSEMBLY

720

722

FORMING A FRIT RETAINER ENABLED TO RECEIVE THE END OF THE COLUMN JACKET TUBE, SUCH THAT THE FRIT RETAINER IS CONFIGURED TO MATE WITH THE SHOULDER AT A FIRST END AND TO MATE WITH A SECOND CAVITY IN THE RETAINER BODY AT A SECOND END, THE FRIT RETAINER FURTHER COMPRISING A FIRST CAVITY AT THE FIRST END CONFIGURED TO RECEIVE THE END OF THE COLUMN JACKET TUBE RADIALLY COVERED BY THE FLANGE PORTION OF THE COLUMN LINER TUBE

724

FORMING THE RETAINER BODY ENABLED TO THREADINGLY ENGAGE THE THREADED TUBE PORTION WITH THE RETAINER BODY, SUCH THAT THE FLANGE PORTION FLUIDICALLY SEALS THE COLUMN JACKET TUBE AGAINST THE FIRST CAVITY, AND THE FRIT RETAINER IS ENCLOSED BY THE RETAINER BODY

FIG. 7B 700-3

METHOD FOR MANUFACTURING A COLUMN ASSEMBLY

720

730

FORMING THE RETAINER BODY ENABLED TO THREADINGLY ENGAGE THE THREADED TUBE PORTION WITH THE RETAINER BODY, AND ENABLED TO RECEIVE THE END OF THE COLUMN JACKET TUBE RADIALLY COVERED BY THE FLANGE PORTION OF THE COLUMN LINER TUBE AT A FIRST CAVITY, SUCH THAT THE RETAINER BODY IS CONFIGURED TO MATE WITH THE SHOULDER AT A FIRST END, AND THE FLANGE PORTION FLUIDICALLY SEALS THE COLUMN JACKET TUBE AGAINST THE FIRST CAVITY, THE RETAINER BODY FURTHER COMPRISING A SECOND CAVITY AT A SECOND END.

FIG. 7C

COLUMN HAVING A COMPRESSION-LIMITED ASSEMBLY

BACKGROUND

Field of the Disclosure

The present disclosure relates generally to tubing and fitting assemblies, and fluidic connection systems, such as those used for chromatography columns in liquid chromatography systems and other analytical instrument systems, and, more specifically, to a column having a compression-limited assembly, as well as a method of manufacture therefor.

Description of the Related Art

Various types of tubing and fitting assemblies may be used for separation columns (also referred to herein as simply "columns") in liquid chromatography systems. The tubing and fitting assemblies may vary in size depending on a type of chromatography separation being performed and may be configured with a variety of connection assemblies for particular applications, as desired. The chromatographic separation performed with the columns may be used to provide an identification of individual constituent molecules in the mobile phase (i.e., an "analyte") along with relative concentrations for individual molecular species. The chromatographic separation may also be used in conjunction with other analytical techniques to determine various properties of analytes. The chromatographic separations may also be used to capture or isolate specific constituent compounds for a variety of other uses.

One performance aspect of liquid chromatography systems is the overall fluid volume of the system, including sample lines (connecting tubes), connectors, fittings, valves, and the chromatography column, where minimal extra-column fluid volume is desirable. As used herein, "extra-column fluid volume" may be defined as any internal fluid volume in the chromatography system from a point of sample injection to a point of sample detection that does not contain the stationary phase actively performing the separation.

Another performance aspect in liquid chromatography is the pressure, with higher pressures being more desirable or having desirable effects, such as enhancement of differential migration, among other benefits. For example, high performance liquid chromatography (HPLC) is known to operate at pressures up to about 60,000 kPa (or about 8,700 psi), while ultra-high-performance liquid chromatography (UHPLC) is known to operate at pressures up to about 120,000 kPa (or about 17,500 psi).

Yet another performance aspect in liquid chromatography is a compatibility of the hardware comprising the chromatography system with the various chemical species used in the separation, including at least one of the mobile phase, the stationary phase, and the injected sample. The hardware compatibility may be based on a low chemical reactivity between the materials used in the chromatography system and the various chemical species, by which no reactions with the various chemical species occurs during separation. The hardware compatibility may also include any other form of undesired interaction between the hardware materials and the various chemical species.

As a result of these performance aspects, high strength stainless steel may typically be used as a material to form liquid chromatography columns. Traditionally, high strength stainless steel has been suitable to achieve the performance aspects described above. However, as desired inner diameters of chromatography columns reach to less than 5 mm, and in some cases less than 3 mm, conventional methods of manufacturing stainless steel tubing may not be capable of attaining a smooth and consistent inner diameter finish, and may result in an inner diameter finish that is rougher than desired for liquid chromatography. In addition, certain mobile phases and analyte components may not be compatible with stainless steel. Thus, when used with stainless steel, certain chemical species may possibly result in degradation or damage to the column hardware, degradation or loss of the analyte, or damage to the chromatography system, which are undesirable.

SUMMARY

In one aspect, a column assembly for chromatography for a column having a compression-limited assembly is disclosed. The column assembly may include a column jacket tube configured for use as a column. In the column assembly, the column jacket tube may comprise a first metal and may have a first inner diameter less than 5 mm. In the column assembly, the column jacket tube may further include a threaded tube portion at one end of the column jacket tube, the threaded tube portion configured to threadingly engage with a retainer body enabled for fluid communication with the column jacket tube at the one end. In the column assembly, the threaded tube portion may further include a shoulder that detains the column jacket tube in the retainer body when the threaded tube portion is engaged with the retainer body. The column assembly may also include a column liner tube configured to cylindrically cover the first inner diameter of the column jacket tube and having a second inner diameter less than the first inner diameter. In the column assembly, the second inner diameter may define a column passageway enabled to receive a stationary phase and a mobile phase, and to isolate at least the mobile phase from contact with the column jacket tube. In the column assembly, the column liner tube may be formed from a biocompatible material and the column tube liner may further integrally include a flange portion that radially covers the one end of the column jacket tube. The column assembly may additionally include a fit retainer configured to mate with the shoulder at a first end and to mate with a second cavity in the retainer body at a second end. In the column assembly, the frit retainer may further include a first cavity at the first end configured to receive the end of the column jacket tube radially covered by the flange portion of the column liner tube. In the column assembly, when the threaded tube portion threadingly engages with the retainer body, the flange portion may fluidically seal the column liner tube against the first cavity, such that the frit retainer is enclosed by the retainer body.

In any of the disclosed embodiments of the column assembly, when the threaded tube portion threadingly engages with the retainer body, the shoulder may be configured for detention contact with the frit retainer to limit a compression force applied by the retainer body to the column liner tube.

In any of the disclosed embodiments of the column assembly, the compression force may be specified to provide a high pressure fluidic seal by compressing the flange portion against the first cavity.

In any of the disclosed embodiments of the column assembly, the high pressure fluidic seal may be enabled to seal the column passageway up to 280,000 kPa (40,000 psi).

In any of the disclosed embodiments of the column assembly, the shoulder in detention contact with the frit retainer may form a secondary seal in addition to the high pressure seal.

In any of the disclosed embodiments, the column assembly may further include a third cavity disposed within the first cavity, the third cavity configured to receive and hold a frit in fluid communication with the column passageway at the flange portion.

In any of the disclosed embodiments of the column assembly, the frit may be a dimpled frit having an increased inlet surface area. In any of the disclosed embodiments of the column assembly, the dimpled frit may include a porous metal. In any of the disclosed embodiments of the column assembly, the porous metal may be a metal foam.

In any of the disclosed embodiments, the column assembly may further include the retainer body that encloses the frit retainer.

In any of the disclosed embodiments of the column assembly, the threaded tube portion may have male threading and the retainer body has female threading that threadingly engage together.

In any of the disclosed embodiments of the column assembly, the threaded tube portion may have female threading and the retainer body has male threading that threadingly engage together.

In any of the disclosed embodiments of the column assembly, the frit retainer may further include a second metal, and the retainer body may further include a third metal. In any of the disclosed embodiments of the column assembly, at least one of the first metal, the second metal, and the third metal may include a stainless steel. In any of the disclosed embodiments of the column assembly, the stainless steel may be an austenitic alloy comprising, in order of composition, the elements Fe, Cr, Mn, Ni, Si. N, and C.

In any of the disclosed embodiments of the column assembly, the biocompatible material may include at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

In any of the disclosed embodiments of the column assembly, the biocompatible material may further include a filler. In any of the disclosed embodiments of the column assembly, the filler may further include at least one type of fiber. In any of the disclosed embodiments of the column assembly, the type of fiber may be selected from at least one of: carbon fibers, nanofibers, and metallic fibers.

In any of the disclosed embodiments of the column assembly, the frit retainer may further include two sections including an outer section corresponding to the first and second ends and a middle section, wherein the first section is formed from a unitary workpiece, wherein the middle section includes a bottom of the first cavity, the third cavity, and a frit passageway in fluid communication with the retainer body, and wherein the middle section is formed from a biocompatible polymer.

In any of the disclosed embodiments of the column assembly, the column jacket tube may further include a threaded tip portion and the first cavity of the frit retainer may be correspondingly threaded to mate with the threaded tip portion.

In any of the disclosed embodiments of the column assembly, the frit retainer may be detained from rotating in the retainer body.

In any of the disclosed embodiments of the column assembly, an external port of the retainer body may be a flat-bottom port for receiving a threaded flat-bottom port fitting.

In any of the disclosed embodiments of the column assembly, an external port of the retainer body may be compatible with a plug-in quick connect fitting.

In any of the disclosed embodiments of the column assembly, the external port of the retainer body may be a nipple for the plug-in quick connect fitting.

In any of the disclosed embodiments of the column assembly, the first inner diameter may be less than 4 mm. In any of the disclosed embodiments of the column assembly, the first inner diameter may be less than 3 mm. In any of the disclosed embodiments of the column assembly, the second inner diameter may be less than 3 mm. In any of the disclosed embodiments of the column assembly, the second inner diameter may be less than 2 mm.

In another aspect, a chromatography column assembly for a column having a compression-limited assembly is disclosed. The chromatography column assembly may include a column jacket tube that may comprise a first metal and may have a first inner diameter. In the chromatography column assembly, the column jacket tube may further include a threaded tube portion at one end of the column jacket tube, the threaded tube portion configured to threadingly engage with a retainer body enabled for fluid communication with the column jacket tube at the one end. In the chromatography column assembly, the threaded tube portion may further include a shoulder that detains the column jacket tube in the retainer body. The chromatography column assembly may also include a column liner tube configured to cylindrically cover the first inner diameter of the column jacket tube and having a second inner diameter less than the first inner diameter. In the chromatography column assembly, the second inner diameter may define a column passageway enabled to receive a stationary phase and a mobile phase, and to isolate at least the mobile phase from contact with the column jacket tube. In the chromatography column assembly, the column liner tube may be formed from a biocompatible material and the column tube liner may further integrally include a flange portion that radially covers the one end of the column jacket tube. The chromatography column assembly may further include a frit retainer configured to mate with the shoulder at a first end and to mate with a second cavity in the retainer body at a second end, the frit retainer further comprising a first cavity at the first end configured to receive and hold a frit in fluid communication with the column passageway at the flange portion. In the chromatography column assembly, when the threaded tube portion threadingly engages with the retainer body, the flange portion may fluidically seal the column liner tube against the first cavity. In the chromatography column assembly, the frit retainer may be enclosed by the retainer body.

In any of the disclosed embodiments of the chromatography column assembly, the frit retainer may further include a third cavity at the first end configured to receive the end of the column jacket tube radially covered by the flange portion of the column liner tube. In the chromatography column assembly, the first cavity may be formed within the third cavity.

In any of the disclosed embodiments of the chromatography column assembly, when the threaded tube portion threadingly engages with the retainer body, the shoulder may be configured for detention contact with the frit retainer to limit a compression force applied by the retainer body to the flange portion.

In any of the disclosed embodiments of the chromatography column assembly, the compression force may be specified to provide a high pressure fluidic seal by compressing the flange portion against the first cavity.

In any of the disclosed embodiments of the chromatography column assembly, the high pressure fluidic seal may be enabled to seal the column passageway up to 280,000 kPa (40,000 psi).

In any of the disclosed embodiments of the chromatography column assembly, the shoulder in detention contact with the frit retainer may form a secondary seal in addition to the high pressure seal.

In any of the disclosed embodiments of the chromatography column assembly, the frit may be a dimpled frit having an increased inlet surface area. In any of the disclosed embodiments of the chromatography column assembly, the dimpled fit may include a porous metal. In any of the disclosed embodiments of the chromatography column assembly, the porous metal may be a metal foam.

In any of the disclosed embodiments, the chromatography column assembly may further include the retainer body that encloses the frit retainer.

In any of the disclosed embodiments of the chromatography column assembly, the threaded tube portion may have male threading and the retainer body has female threading that threadingly engage together.

In any of the disclosed embodiments of the chromatography column assembly, the threaded tube portion may have female threading and the retainer body has male threading that threadingly engage together.

In any of the disclosed embodiments of the chromatography column assembly, the frit retainer may include a second metal, and the retainer body may include a third metal. In any of the disclosed embodiments of the chromatography column assembly, at least one of the first metal, the second metal, and the third metal may include a stainless steel. In any of the disclosed embodiments of the chromatography column assembly, the stainless steel may be an austenitic alloy comprising, in order of composition, the elements Fe, Cr, Mn, Ni, Si. N, and C.

In any of the disclosed embodiments of the chromatography column assembly, the biocompatible material may include at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

In any of the disclosed embodiments of the chromatography column assembly, the frit retainer may further include two sections including an outer section corresponding to the first and second ends and a middle section. In the chromatography column assembly, the first section may be formed from a unitary workpiece. In the chromatography column assembly, the middle section of the frit retainer may include a bottom of the third cavity, the first cavity, and a frit passageway in fluid communication with the retainer body. In the chromatography column assembly, the middle section of the frit retainer may be formed from a biocompatible polymer.

In any of the disclosed embodiments of the chromatography column assembly, the column jacket tube may further include a threaded tip portion and the third cavity of the frit retainer is correspondingly threaded to mate with the threaded tip portion.

In any of the disclosed embodiments of the chromatography column assembly, the retainer body may further include a detention feature for detaining the frit retainer from rotating in the retainer body.

In any of the disclosed embodiments of the chromatography column assembly, an external port of the retainer body may be a flat-bottom port for receiving a threaded flat-bottom port fitting. In any of the disclosed embodiments of the chromatography column assembly, an external port of the retainer body may be compatible with a plug-in quick connect fitting. In any of the disclosed embodiments of the chromatography column assembly, the external port of the retainer body may be a nipple for the plug-in quick connect fitting.

In any of the disclosed embodiments of the chromatography column assembly, the first inner diameter may be less than 4 mm. In any of the disclosed embodiments of the chromatography column assembly, the first inner diameter may be less than 3 mm. In any of the disclosed embodiments of the chromatography column assembly, the second inner diameter may be less than 3 mm. In any of the disclosed embodiments of the chromatography column assembly, the second inner diameter may be less than 2 mm.

In a further aspect, a method for manufacturing a column assembly for a column having a compression-limited assembly is disclosed. The method may include using computer numerical control (CNC) machining to form a column jacket tube configured for use as a chromatography column enabled to separate molecular species in a mobile phase. In the method, the column jacket tube may be formed using a first metal and may have first inner diameter less than about 5 mm, the column jacket tube further comprising a threaded tube portion at least one end of the column jacket tube, the threaded tube portion configured to threadingly engage with a retainer body enabled for fluid communication of the column jacket tube at the at least one end. In the method, the threaded tube portion may further include a shoulder that detains the column jacket tube in the retainer body. The method may also include extruding a polymer tube comprised of a biocompatible polymer to a first outer diameter that is greater than the first inner diameter of the column jacket tube, and cold-drawing the polymer tube through a die at room temperature to reduce the first outer diameter to a second outer diameter that is less than the first inner diameter of the column jacket tube, to create a column liner tube. The method may further include inserting the column liner tube into the column jacket tube, such that the column liner tube may extend beyond both ends of the column jacket tube, and securing the column liner tube in the column jacket tube, such that the column liner tube may be configured to cylindrically cover the first inner diameter of the column jacket tube and the column liner tube may have a second inner diameter less than the first inner diameter of the column jacket tube. In the method, the second inner diameter may define a column passageway enabled to receive a stationary phase and the mobile phase, and to isolate at least the mobile phase from contact with the column jacket tube. The method may still further include flaring at least one end of the column liner tube to form a flange portion that radially covers the at least one end of the column jacket tube. The method may additionally include forming a frit retainer enabled to receive the end of the column jacket tube, such that the frit retainer is configured to mate with the shoulder at a first end and to mate with a second cavity in the retainer body at a second end, the frit retainer further comprising a first cavity at the first end configured to receive the end of the column jacket tube radially covered by the flange portion of the column liner tube. The method may additionally include forming the retainer body enabled to threadingly engage the threaded tube portion with the retainer body. In the method, the flange portion may fluidically seal the column liner tube against the first cavity, and the frit retainer may be enclosed by the retainer body.

In certain embodiments, instead of forming the frit retainer and the retainer body as separate workpieces, the method may include forming a second retainer body enabled to threadingly engage the threaded tube portion with the retainer body, and enabled to receive the end of the column jacket tube radially covered by the flange portion of the column liner tube at a first cavity, such that the retainer body is configured to mate with the shoulder at a first end. In the method to form the second retainer body, the flange portion may fluidically seal the column liner tube against the first cavity, the retainer body further comprising a second cavity at a second end.

In any of the disclosed embodiments of the method, the retainer body enabled to threadingly engage the threaded tube portion with the retainer body may further include contacting, in detention by the shoulder, the frit retainer to limit a compression force applied by the retainer body to the column jacket tube. In any of the disclosed embodiments of the method, the compression force may be specified to provide a high pressure fluidic seal by compressing the flange portion against the first cavity. In any of the disclosed embodiments of the method, the high pressure fluidic seal may be enabled to seal the column passageway up to 280,000 kPa (40,000 psi).

In any of the disclosed embodiments of the method, contacting, in detention by the shoulder, the frit retainer may further include forming a secondary seal between the shoulder in detention contact with the frit retainer in addition to the high pressure seal.

In any of the disclosed embodiments of the method, inserting the frit into the frit retainer may further include inserting the frit into a third cavity disposed within the first cavity, the third cavity configured to receive and hold a fit in fluid communication with the column passageway at the flange portion.

In any of the disclosed embodiments of the method, the frit may be a dimpled frit having an increased inlet surface area. In any of the disclosed embodiments of the method, the dimpled frit may include a porous metal. In any of the disclosed embodiments of the method, the porous metal may be a metal foam.

In any of the disclosed embodiments of the method, the threaded tube portion may have male threading and the retainer body has female threading that threadingly engage together.

In any of the disclosed embodiments of the method, the threaded tube portion may have female threading and the retainer body has male threading that threadingly engage together.

In any of the disclosed embodiments of the method, the frit retainer may include a second metal, and the retainer body may include a third metal. In any of the disclosed embodiments of the method, the first metal, the second metal, and the third metal may include a stainless steel. In any of the disclosed embodiments of the method, the stainless steel may be an austenitic alloy comprising, in order of composition, the elements Fe, Cr, Mn, Ni, Si. N, and C.

In any of the disclosed embodiments of the method, the biocompatible material may include at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), polychlorotrifluoroethylene (PCTFE).

In any of the disclosed embodiments of the method, the frit retainer may further include two sections including an outer section corresponding to the first and second ends and a middle section. In the method, the first section may be formed from a unitary workpiece. In the method, the middle section of the frit retainer may include a bottom of the third cavity, the first cavity, and a frit passageway in fluid communication with the retainer body. In the method, the middle section of the frit retainer may be formed from a biocompatible polymer.

In any of the disclosed embodiments of the method, the column jacket tube may further include a threaded tip portion and the first cavity of the frit retainer is correspondingly threaded to mate with the threaded tip portion.

In any of the disclosed embodiments of the method, the frit retainer may be detained from rotating in the retainer body.

In any of the disclosed embodiments of the method, an external port of the retainer body may be a flat-bottom port for receiving a threaded flat-bottom port fitting. In any of the disclosed embodiments of the method, an external port of the retainer body may be compatible with a plug-in quick connect fitting. In any of the disclosed embodiments of the method, the external port of the retainer body may be a nipple for the plug-in quick connect fitting.

In any of the disclosed embodiments of the method, the first inner diameter may be less than 4 mm. In any of the disclosed embodiments of the method, the first inner diameter may be less than 3 mm. In any of the disclosed embodiments of the method, the second inner diameter may be less than 3 mm. In any of the disclosed embodiments of the method, the second inner diameter may be less than 2 mm.

In yet another aspect, a second column assembly for a column having a compression-limited assembly is disclosed. The second column assembly may include a column jacket tube configured for use as a chromatography column enabled to separate molecular species in a mobile phase. In the second column assembly, the column jacket tube may be formed using a first metal and may have a first inner diameter less than about 5 mm. In the second column assembly, the column jacket tube may further include a threaded tube portion at least one end of the column jacket tube, the threaded tube portion configured to threadingly engage with a retainer body enabled for fluid communication of the column jacket tube at the at least one end. In the second column assembly, the threaded tube portion may further include a shoulder that detains the column jacket tube in the retainer body. The second column assembly may further include a column liner tube configured to cylindrically cover the first inner diameter of the column jacket tube and having a second inner diameter less than the first inner diameter. In the second column assembly, the second inner diameter may define a column passageway enabled to receive a stationary phase and the mobile phase, and to isolate the mobile phase from contact with the column jacket tube. In the second column assembly, the column liner tube may be formed from a biocompatible material and may further include a flange portion that radially covers the at least one end of the column jacket tube. The second column assembly may further include the retainer body comprising a first cavity configured to receive the end of the column jacket tube radially covered by the flange portion of the column liner tube, the retainer body further comprising a second cavity disposed in the first cavity. In the second column assembly, the second cavity may be configured to receive a frit. In the second column assembly, when the threaded tube portion threadingly engages with the retainer body, the flange portion may fluidically seal the column liner tube against the first cavity.

In any of the disclosed embodiments of the second column assembly, the column jacket tube may further include a threaded tip portion and the first cavity of the retainer body may be correspondingly threaded to mate with the threaded tip portion.

In any of the disclosed embodiments of the second column assembly, the threaded tube portion may have male threading and the retainer body may have female threading that threadingly engage together.

In any of the disclosed embodiments of the second column assembly, the threaded tube portion may have female threading and the retainer body may have male threading that threadingly engage together.

In any of the disclosed embodiments of the second column assembly, an external port of the retainer body may be a flat-bottom port for receiving a threaded flat-bottom port fitting. In any of the disclosed embodiments of the second column assembly, an external port of the retainer body may be compatible with a plug-in quick connect fitting. In any of the disclosed embodiments of the second column assembly, the external port of the retainer body may be a nipple for the plug-in quick connect fitting.

In any of the disclosed embodiments of the second column assembly, the first inner diameter may be less than 4 mm. In any of the disclosed embodiments of the second column assembly, the first inner diameter may be less than 3 mm. In any of the disclosed embodiments of the second column assembly, the second inner diameter may be less than 3 mm. In any of the disclosed embodiments of the second column assembly, the second inner diameter may be less than 2 mm.

BRIEF DESCRIPTION OF THE DRAWINGS

FIGS. 7A, 7B, and 7C are flowcharts showing selected elements of one embodiment of a method for manufacturing and assembling a column having a compression-limited assembly.

DETAILED DESCRIPTION

Figure 1:
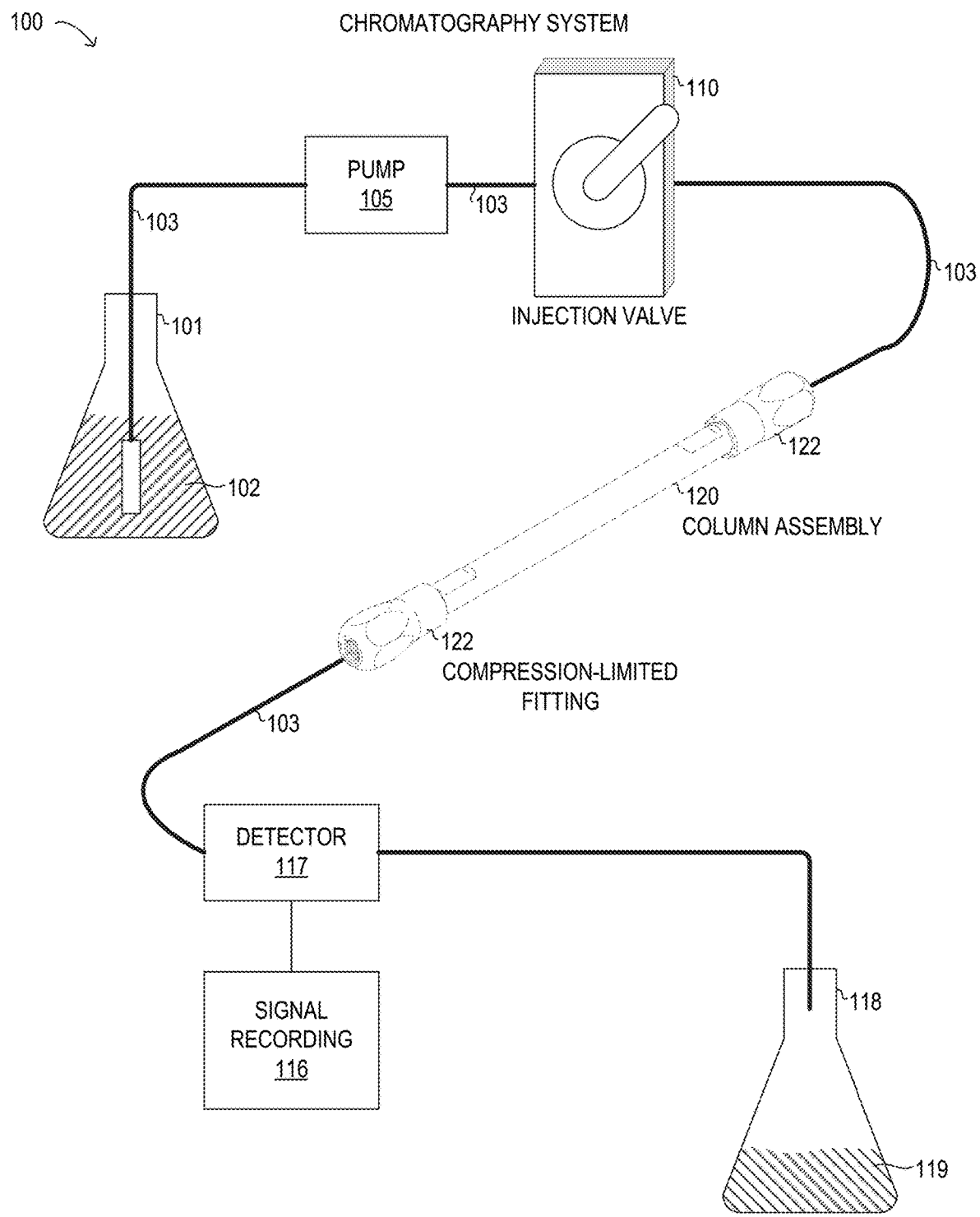
FIG. 1 depicts a block diagram of a liquid chromatography system having a column having a compression-limited assembly.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Liquid chromatography (LC) is a technique for separating the constituent molecular compounds in a given sample for analysis, referred to as an analyte. In an LC system, a liquid solvent (also referred to as a "mobile phase") is introduced from a reservoir and is pumped through the LC system using a pump. The mobile phase exits the pump under pressure. The mobile phase then travels via tubing to a sample injection valve that allows an operator to inject the analyte into the LC system, where the analyte will be carried along with the mobile phase, in which the analyte is dissolved.

In an LC system, the analyte and mobile phase pass through one or more filters (and optionally a guard column) before coming to a chromatography column (or simply "column"), in which the separation of the analyte into constituent molecular species occurs. A typical column may comprise a piece of steel tubing that has been packed with a "packing" material. The packing material may consist of particulate material packed (or filled) inside the column. The packing material may consist of particles made of silica or polymers or other suitable materials, which may be chemically bonded with a chemical functionality. The packing material is also known as a "stationary phase". One of the fundamental principles of separation using chromatography is that the mobile phase continuously passes through the stationary phase. When the analyte is carried through the column (by the mobile phase), the various constituent molecular species or compounds (solutes) in the analyte may migrate through the stationary phase within the column at different rates (i.e., there may be differential migration of the solutes depending on molecular interactions between the solutes and the stationary phase). In other words, the various molecules in the analyte may move through the column at different rates. Because of different rates of movement (i.e., differential migration), the different molecular species may gradually separate upon moving through the column. Differential migration may be affected by various factors, such as a composition of the mobile phase, a composition of the stationary phase (i.e., the material with which the column is packed), a pumping flow rate, a temperature at which the separation takes place, and also a surface finish (or roughness) inside the column. Thus, such factors may influence the separation of the analyte's various constituent molecular species.

When the analyte leaves the column (after separation has occurred), the analyte may flow with the mobile phase past a detector. The detector may detect the presence of specific molecules or compounds. Two general types of detectors are often used in LC applications. One type of detector may measure a change in an overall physical property of the mobile phase and the analyte (such as refractive index). Another type of detector may directly measure a property of the analyte (such as the absorption of ultraviolet radiation). In essence, a typical detector in an LC system can measure and provide an output signal representing mass per unit of volume (such as grams per milliliter) or mass per unit of time (such as grams per second) of the analyte's components. From such an output signal, a "chromatogram" can be generated and the chromatogram may then be used to determine the chemical components present in the analyte, the presence of unknown or unwanted compounds, or an amount of certain specific compounds.

In addition to the above components, an LC system may often include filters, check valves, a guard column, or the like, in order to prevent contamination of the sample or damage to the LC system. For example, an inlet solvent filter may be used to filter out particles from the solvent (or mobile phase) before the solvent reaches the pump. A guard column may be placed before the analytical or preparative column (i.e., the primary column) to "guard" the primary column by absorbing unwanted sample components that might otherwise bind irreversibly to the analytical or preparative column, which may be sensitive to adulteration or exposure to the unwanted sample components.

In practice, various components in an LC system may be connected to perform a given task. For example, an operator may select an appropriate mobile phase and a column, and then connect a supply of the selected mobile phase along with the selected column to the LC system before operation. In order to be suitable for HPLC applications, each connection and component should be able to withstand the operating pressures of the HPLC system. If the component is too weak, the component may leak or otherwise fail in operation, which is undesirable. Because the solvents used with the mobile phase may be toxic and because it may be expensive to obtain and prepare additional samples for use, any such connection failure is a serious concern that may affect the operation and resources consumed during use of an HPLC system.

It is fairly common for an operator to disconnect a first column (or other component) from an LC system and then connect a different column (or other component) in place of the first column after one separation has finished and before the next separation begins. Given the importance of leak-proof connections, especially in HPLC or UHPLC applications, the operator may take time to be sure the connection is sufficiently durable. In a typical laboratory setting, replacing a column (or other component of an LC system) may occur several times in a day. Moreover, the time involved in disconnecting and then connecting a column (or other component of the LC system) may be unproductive because the LC system is not in use and the operator is engaged in plumbing the system, instead of preparing samples or other more productive activities. Hence, the replacement of a column in a conventional LC system may waste time and resources and may represent an undesired inefficiency in performing LC.

Given concerns about leak-free connections and components, conventional HPLC and UHPLC connections and components have been constructed using stainless steel, and may often include stainless steel tubing and fittings. More recently, however, it has been observed that the use of stainless steel components in an LC system may have potential disadvantages in situations involving samples of biological origin or samples generally related to biological processes. For example, the analytes in a biological sample may become attached to the inner wall of stainless steel tubing, such as through adsorption, chemical bonding, or other physical processes, particularly where the inner wall is overly rough or lacks consistent smoothness. The amount of analyte that remains behind attached to the inner wall of the stainless steel tubing may present problems for the LC analysis, because the detector's measurements (and thus the chromatogram) of a given analyte may not accurately reflect the analyte concentration in the initial sample, if some of the analyte's molecules or ions remain in the LC system, and do not pass the detector. Furthermore, ions from the stainless steel tubing may detach from the tubing, become dissolved in the mobile phase, and accordingly flow past the detector, thus leading to potentially erroneous results. Additionally, ions may bind to biological compounds of interest in an analyte, resulting in changes to the molecules that may affect retention time in the column. Hence, so-called "biocompatible" connections and components may be realized through the use of a material that is chemically inert with respect to such "biological" samples, along with the mobile phase used with the biological samples. As used herein, "biocompatible" and "biocompatibility" with respect to connections, components, and materials used in HPLC or UHPLC refers to the ability to remain inert in the presence of such biological samples under the physical conditions being applied, or the ability to have no, or substantially no adverse impact on a chromatographic separation, such as a quantitative impact or a qualitative impact. Accordingly, biocompatible connections and biocompatible components may be desirable so that the analyte does not negatively interact with non-biocompatible materials, and so that ions are prevented from being released by the non-biocompatible materials and potentially contaminating the analyte.

In many applications columns and other fluidic connections, and in particular in liquid chromatography, the volume of fluids may be small. A small fluid volume is particularly indicated or desirable when liquid chromatography is being used as an analytical method as opposed to a semi-preparative or preparative method (i.e., a pre-production or production scale method). Such analytical methods may use columns referred to as microbore, nanobore, or capillary columns and may be referred to as "nano-scale chromatography" or "capillary chromatography". In capillary chromatography for both gas phase and liquid phase, it is often desired to minimize the internal volume of the extra-column components (e.g., components located prior to or after the packed column volume as defined by the flow direction). One reason for minimized internal volume is that an extra-column component having a large volume will contain a relatively large volume of liquid, and when an analyte is injected into or flows through this relatively large volume, the analyte may be diluted or dispersed, thereby decreasing the resolution and sensitivity of the analytical method, which is undesirable.

Micro-fluidic analytical processes may also involve relatively small sample sizes. As used herein, sample volumes considered to involve micro-fluidic techniques can range from as low as volumes of about several picoliters, up to volumes of about several milliliters, whereas more traditional LC techniques, for example, have historically often involved samples of about one microliter to about 100 milliliters in volume. Thus, the micro-fluidic techniques described herein may involve volumes one or more orders of magnitude smaller in size than traditional LC techniques. Micro-fluidic techniques can also be described as involving fluid flow rates of about 0.5 ml/minute or less.

Conventional HPLC systems include pumps, which can generate relatively high pressures of up to about 35,000 kPa to 41,500 kPa (or about 5,000 psi to 6,000 psi). In many situations, an operator can obtain successful results by operating an LC system at "low" pressures from about tens of kPa (or a few psi) up to about 7,000 kPa (or about 1,000 psi). However, an operator may find it desirable to operate an LC system at relatively "higher" pressures of greater than about 7,000 kPa (or about 1,000 psi).

Another, relatively newer liquid chromatography form is UHPLC, in which system pressure may extend upward to about 140,000 kPa (or about 1,400 bar or 20,000 psi), or greater, for example, by using the column having a compression-limited assembly, as disclosed herein. In order to achieve greater chromatographic resolution and higher sample throughput, the particle size used for the stationary phase may be extremely small. A stationary phase particle as small as 1 micron may be used and the resulting high column packing density may lead to substantially increased system pressure at the head of the column.

Both HPLC and UHPLC are examples of analytical instrumentation that utilize fluid transfer at elevated pressures. For example, in U.S. Pat. No. 8,173,070 B2, issued on May 8, 2012 and titled "Sample Injector System for Liquid Chromatography," an injection system is described for use with UHPLC applications, which are said to involve pressures in the range from 20,000 psi to 120,000 psi. In U.S. Pat. No. 7,311,502, issued on Dec. 25, 2007 to Gerhardt, et al., and titled "Method for Using a Hydraulic Amplifier Pump in Ultrahigh Pressure Liquid Chromatography," the use of a hydraulic amplifier is described for use in UHPLC systems involving pressures in excess of 25,000 psi. In U.S. Pat. No. 7,144,502 B2, issued on Dec. 5, 2006 and titled "Chromatography System with Gradient Storage and Method for Operating the Same," a system for performing UHPLC is disclosed, with UHPLC described as involving pressures above 5,000 psi (and up to 60,000 psi). Applicants hereby incorporate by reference as if fully set forth herein U.S. Pat. Nos. 7,311,502, 8,173,070, and 7,144,502.

As noted, liquid chromatography (as well as other analytical) systems, including HPLC or UHPLC systems, typically include several components. For example, such a system may include a pump, an injection valve or autosampler for injecting the analyte, a precolumn filter to remove particulate matter in the analyte solution that might clog the column, a packed bed to retain irreversibly adsorbed chemical material, the HPLC column itself, and a detector that analyzes the analyte solution upon leaving the column. Such various components may typically be connected by a miniature fluid conduit, or tubing, such as metallic or polymeric tubing, usually having an internal diameter of about 25 microns to 500 microns (or about 0.001 inch to 0.020 inch).

The various components and lengths of tubing may typically be interconnected by threaded fittings. Fittings for connecting various LC system components and lengths of tubing are disclosed in prior patents, for example, U.S. Pat. Nos. 5,525,303; 5,730,943; and 6,095,572, the disclosures of which are herein all incorporated by reference as if fully set forth herein. An LC system is shown and described in U.S. Pat. No. 5,472,598, issued Dec. 5, 1995 to Schick, which is hereby incorporated by reference as if fully set forth herein.

It is noted that, as used herein, the term "LC system" is intended in its broad sense to include all apparatus and components in a system used in connection with liquid chromatography, whether made of only a few simple components or made of numerous, sophisticated components, such as components that are automated or computer-controlled or the like. It is also noted that an LC system is one type of an analytical instrument (AI) system. For example, gas chromatography is similar in many respects to liquid chromatography, but involves a gas sample to be analyzed. Such analytical instrument systems include high performance or high pressure liquid chromatography systems, ultra high performance or ultra high pressure liquid chromatography systems, mass spectrometry systems, microflow chromatography systems, nanoflow chromatography systems, nano-scale chromatography systems, capillary electrophoresis systems, reverse-phase gradient chromatography systems, or any combination thereof. Although the following discussion focuses on liquid chromatography, it will be understood that the present disclosure may also apply to other types of AI systems and methods.

The increasing pressures being applied in liquid chromatography have been accompanied by the use of corresponding high pressure fluidic components. For many applications regular stainless steel tubing can be used to withstand the high pressure. However, for some types of analyses (e.g., biological analytes, metal/ion analyses), stainless steel or other metals are not desired in the fluid path because metal ions from the stainless steel may interfere with the chromatography, as explained previously. Additionally, there are some fields of use (e.g., nano-scale or nano-volume analyses), that involve very small inner diameters (along the flow path) to accommodate the extremely low volumes used in such applications. However, stainless steel or other metals may not be suitable for nano-scale or nano-volume analyses, for example, due to manufacturing constraints associated with such metals, including, among other factors, the smoothness of the surface finish of the inner diameters that are achievable.

In HPLC, UHPLC, and other high pressure analytic chemistry applications, various system components and associated fluidic connections may be configured to withstand pressures of about 105,000 kPa to 140,000 kPa (or about 15,000 to 20,000 psi). In addition, certain components, such as columns, may be configured to withstand pressures beyond typical pressures used with HPLC or UHPLC systems due to the process by which the stationary phase is packed into the column. A column having a compression-limited assembly, as disclosed herein, is enabled for operation at pressures as great as about 140,000 kPa (or about 20,000 psi), and in some implementations, may be enabled for operation at pressures as great as about 280,000 kPa (or about 40,000 psi).

In a column, a first fitting may be used to secure a first seal with a ferrule or other sealing means at the column end. The first fitting may be threadedly connected through multiple turns by hand or by use of a wrench or wrenches to a second fitting or the column tube having a correspondingly mating threading. In various implementations, external or internal threads may be used with the fittings. In turn, the column tube may be sealed to a second fitting by a ferrule or other sealing means. Connecting or disconnecting these fittings for component replacement, maintenance, or reconfiguration may involve the use of a wrench or wrenches to thread or unthread the fittings. Although a wrench or wrenches may be used, other tools such as pliers or other gripping and holding tools are also sometimes used. Column assemblies relying upon a seal for high-pressure applications may be associated with a significant amount of torque to effectuate a fluid-tight seal, making the creation of such seals difficult without the use of additional tools and increasing the risk of damage to the column assembly or other components due to overtightening. Moreover, experience suggests that many users do not like to use certain tools to assemble or disassemble a column. It is believed that users often apply different amounts of torque to assemble or disassemble such column systems, thus potentially resulting in issues caused by over-tightening or under-tightening (e.g., leakage or loss of sealing when the fluid is under pressure).

For example, published U.S. Patent Application No. 2013/0043677, titled "Tube and Pipe End Cartridge Seal," published on Feb. 21, 2013, describes a tube and pipe end cartridge seal for use at high pressures, which relies on a fitting body (including ferrule fittings) to effectuate a seal with the axial end of a tube. Moreover, a dimple is forged on the annular end of the tube face to further effectuate the seal.

One example of a flat-bottomed or face-sealing connection assembly is provided by U.S. Pat. No. 8,696,038, titled "Flat Bottom Fitting Assembly" and issued on Apr. 15, 2014 to Nienhuis. Nienhuis teaches a type of flat bottom assembly which includes a flat-sided ferrule, and wherein the assembly including the ferrule and the tube can be pressed against a flat bottom port. Another example of a flat-bottomed or face-sealing connection assembly is provided by published U.S. Pat. No. 9,056,264, titled "Biocompatible Tubing for Liquid Chromatography Systems," which was issued on Jun. 16, 2015 and was filed on behalf of Hahn et al. The Hahn et al. published patent application describes tubing having an inner layer and an outer layer, and in which the inner layer can be biocompatible material such as polyetheretherketone (PEEK) and the outer layer may be a different material, and in which an end of the tubing may be flared or otherwise adapted to have a larger outer diameter than other portions of the tubing.

In LC, carry over may occur when the analyte from one chromatography separation is carried over to a subsequent chromatography separation on the same system. Carry over can produce unstable results because the baseline condition of the system before and after a chromatography separation does not remain constant. In LC, band broadening may occur when the peaks identifying a substance become less symmetric and make identification more difficult when peaks of different molecules have similar retention times. Thus, band broadening may be a symptom of interference between different molecules subject to a chromatography separation.

European Patent No. EP 2564104 describes a sealing system for use at high pressure. End-face seals minimize the sealing radius and therefore allow various fittings (including known ferrule fittings) to be used in high-pressure systems. End-face seals at such high pressure may require smooth surfaces, however. In order to reduce cost, an end-face preparation tool may be required to forge a dimple into the end face to mechanically deform and smooth the surface.

U.S. Pat. No. 6,056,331 describes an apparatus that is composed of three components, a body, a ferrule, and a threaded fitting. The ferrule is compressed onto a tube and a seal is formed between the tube and a device retailed in the body by threading the fitting into the body which provides pressure that seals the face of the ferrule to a mating surface on the device. This seal may be used at elevated temperatures, depending on the materials used. This fitting was developed for use with micro-machined silicon wafers used in capillary gas chromatography.

U.S. Pat. Nos. 5,472,598, 5,525,303, 5,730,943, 6,056,0331, 6,095,572, 6,056,331, 7,311,502, 8,696,038, 8,173,070, 7,144,502, 9,056,264, European Patent No. EP2564104, and published U.S. Patent Application Nos. 2012/0061955 and 2013/0043677 are hereby incorporated by reference as if fully set forth herein.

Accordingly, as noted above, smaller diameters of tubing and chromatography columns are desirable, particularly for UHPLC at high pressures and at ultra high pressures, as mentioned above. Very small inner diameters of tubing and chromatography columns, such as less than about 2 mm in inner diameter that are referred to herein as "microtubes", are typically not available in stainless steel or other high strength, relatively inert metal tubing that is suitable for use as a chromatography column. Although microtubes may be fabricated in stainless steel or other suitable metals for columns, the inner finishes of such microtubes may exhibit an undesirably high level of surface roughness, particularly for the very heavy wall thicknesses that are specified for very high pressures, such as in UHPLC. Thus, it may be very difficult or impossible to achieve sufficiently smooth and consistent inner surfaces in microtubes using stainless steel or other suitable metals for columns for inner diameters less than about 2 mm. Without a sufficiently smooth and consistent inner surface of the microtube, certain problems such as carry over or band broadening, among others, may be exacerbated, including when such microtubes are used for the chromatography column itself.

In contrast, polymer-lined metal tubing is known to achieve a smooth and consistent inner surface finish for inner diameters down to 2 mm and below and is known to withstand very high pressures. In addition, polymer-lined metal tubing may be used in metal-free designs to eliminate unwanted interactions that have been observed in certain types of separations, and may be suitable to achieve a biocompatible chromatography system, including for the chromatography column.

A chromatography column is typically connected at both ends to the chromatography system and may accordingly have fittings with inlet and outlet ports at the respective ends. The fittings may also form part of a termination at each respective end of the column tube, helping to maintain the stationary phase in the column tube. Therefore, the ability to easily and properly assemble, disassemble, connect, or disconnect the chromatography column may be determined by the functionality provided by the end fittings, and in particular, the ability of the end fittings to seal the column to the desired pressures, while being easy to handle by personnel, such as by the ease of tightening the fittings to a proper tightness. If the torque applied is less than an indicated torque for sealing the fitting, the fitting may leak at very high pressures or below. If the torque applied is greater than the indicated torque, certain tube or fitting components may become prematurely worn or damaged, and may fail earlier than expected, which may also result in pressure loss or leaks. Thus, the use of polymer-lined microtubing for chromatography columns capable of withstanding very high pressures, such as high pressures applied during UHPLC, may be limited by the availability of suitable end fittings and connections that facilitate ease of use, but still are enabled to apply the indicated torque and effectively prevent over-tightening and under-tightening in practical daily use. The use of polymer-lined microtubing may also be limited by the availability of suitable end fittings that function at pressures that may be used with UHPLC.

As will be described in further detail, a column having a compression-limited assembly, as well as a method of manufacture therefor, is disclosed herein. The column having a compression-limited assembly disclosed herein may have a polymer-lined metal column tube assembly that is suitable for use in implementations having inner diameters of 2 mm or smaller, including in implementations having an inner diameter of 1 mm or smaller. The column having a compression-limited assembly disclosed herein may be equipped with compression-limited fittings that facilitate assembly and disassembly of the fittings to reliably and consistently seal the ends of the column and avoid over-tightening and under-tightening. The column having a compression-limited assembly disclosed herein may have a nearly metal-free or a totally metal-free interior volume, including at the compression-limited fittings. The column having a compression-limited assembly disclosed herein may have a continuous column liner tube comprising a polymer that forms sealing flanges at respective ends of the column tube assembly. The column having a compression-limited assembly disclosed herein may be equipped with compression-limited fittings that seal the ends of the column to pressures up to about 280,000 kPa (or about 40,000 psi) or greater. The column having a compression-limited assembly disclosed herein may be equipped with compression-limited fittings incorporating a frit retainer configured to hold a frit in fluid communication with the column passageway. The column having a compression-limited assembly disclosed herein may be equipped with compression limited fittings that support threaded external fittings, such as by providing a flat-bottom port for a threaded connector. The column having a compression-limited assembly disclosed herein may be equipped with compression-limited fittings that support quick connect external fittings that are plugged in, such as by providing a nipple for the quick connect external fitting.

Referring now to the drawings, FIG. 1 depicts a block diagram of selected elements of a liquid chromatography (LC) system 100. FIG. 1 is a schematic illustration and is not drawn to scale or perspective. It will be understood that in different embodiments, more or fewer elements may be used with LC system 100 than depicted in FIG. 1. As shown, LC system includes a reservoir 101, conduit 103 for interconnecting various components of LC system 100, a pump 105, an injection valve 110, a column assembly 120 with compression-limited fittings 122, a detector 117, a signal recorder 116, and a second reservoir 118.

In operation of LC system 100, a reservoir 101 is prepared to contain a solvent, represented by mobile phase 102. Tubing 103 is shown connecting various elements in LC system 100 in fluid communication. Tubing 103 may be used in different individual segments, such as by using appropriate fittings to maintain the fluid communication at operating pressures of LC system 100. Mobile phase 102 flows through the tubing 103 (indicated schematically by a thick line in FIG. 1) used to connect the various components of LC system 100 together. Specifically, as shown in FIG. 1, tubing 103 conveys the mobile phase 102 in the reservoir 101 to a pump 105, which may draw in mobile phase 102 at a first pressure and output mobile phase 102 at a second pressure that is higher than the first pressure. As shown, pump 105 is connected to an injection valve 110, which may have various internal and external connections (not shown), including a sample loop or other means for injecting a desired volume of analyte into mobile phase 102 when flowing. For example, injection valve 110 may be connected via tubing to a first end of a guard column (not shown) that is used prior to column assembly 120, which serves as the primary column in LC system 100. From the guard column (not shown) or from injection valve 110, tubing 103 leads to column assembly 120, which serves as the primary column in LC system 100. The second end of column assembly 120 is connected via tubing 103 to detector 117. Detector 117 may be enabled to generate a signal that is indicative of an amount of analyte passing through the detector at a given time. Accordingly, detector 117 may have sufficient detection bandwidth to make individual measurements that support desired flow rates used with LC system 100, in order to resolve constituent molecular species in the analyte under the operating conditions used with LC system 100. As shown in LC system 100, after passing through detector 117, mobile phase 102 and the analyte injected via injection valve 110 are expended into a second reservoir 118, which may be used for chemical waste 119, such as generated from continued operation of LC system 100 with various different analytes. As noted above, the sample injection valve 110 is used to inject a desired volume of the analyte (i.e., a material to be studied) into LC system 100.

In FIG. 1, when the analyte (not shown) is injected via injection valve 110 in LC system 100, the analyte is carried by mobile phase 102 through tubing 103 into column assembly 120. Column assembly 120 is configured as a chromatography column and may accordingly contain a packing material in an inner passageway (as defined by the inner diameter, not visible in FIG. 1, see FIGS. 3, 4, and 5). The packing material acts to chemically, fluidically, or otherwise separate the constituent molecular species of the analyte, as described previously, based on differential interactions between the constituent molecular species and the packing material (i.e., the stationary phase). Upon exiting column assembly 120, the analyte has presumably been at least partially separated by the chromatography process into the constituent molecular species. The separated analyte is carried from column assembly 120 to detector 117. Detector 117 may generate an output signal that is indicative of a concentration of various molecules versus time, and has sufficient temporal and molecular sensitivity (i.e., detection limit, precision, accuracy) to resolve the molecular species. Thus, as shown, the output signal from detector 117, which may be indicative of a chromatogram of the analyte, is received by signal recorder 116, which may process and record the signal and output data indicative of the chromatogram, or the chromatogram itself.

In a first example, detector 117 may generate an optical signal, such as an absorptivity to a certain wavelength of light that detector 117 transmits through the mobile phase 102, and may output the optical signal after conversion to an analog electrical signal. In the first example, signal recorder 116 may receive the analog electrical signal (e.g., a current or a voltage) and may cause a trace proportional of the analog electrical signal to be recorded on paper moving at a specified velocity (e.g., a chart recorder), in order to record the chromatogram. In other embodiments of the first example, signal recorder 116 may be a digital device, such as a computer system having at least a processor and a memory, and configured to execute instructions by the processor that are stored in the memory. Thus, signal recorder 116 may digitize the analog electrical signal and may record corresponding digital information indicative of the chromatogram to record the chromatogram.

In a second example, detector 117 may be an integrated electronics device, and may include various semiconductor devices, and may directly generate a digital signal that is indicative of the chromatogram. In the second example, signal recorder 116 may be the computer system described above and may receive the digital signal indicative of the chromatogram and may store digital data to record the chromatogram. The recording of the chromatogram, however generated and stored by signal recorder 116, may be then used by an operator of LC system 100 for desired analyses or purposes related to the analyte. For example, signal recorder 116 may itself generate and process the chromatogram or may enable a software program to be used by the operator to view, analyze, store, send, receive, or otherwise process the recording of the chromatogram.

From LC system 100 in FIG. 1, column assembly 120 will now be described in further detail below with respect to the subsequent drawings. It is noted that while LC system 100 is shown as an example of the use of column assembly 120, various other chromatography applications may use column assembly 120, including at least one of microflow chromatography, nanoflow chromatography, nano-scale liquid chromatography, reverse-phase gradient chromatography, biocompatible chromatography, ion chromatography, and gas chromatography, among others.

Figure 2:
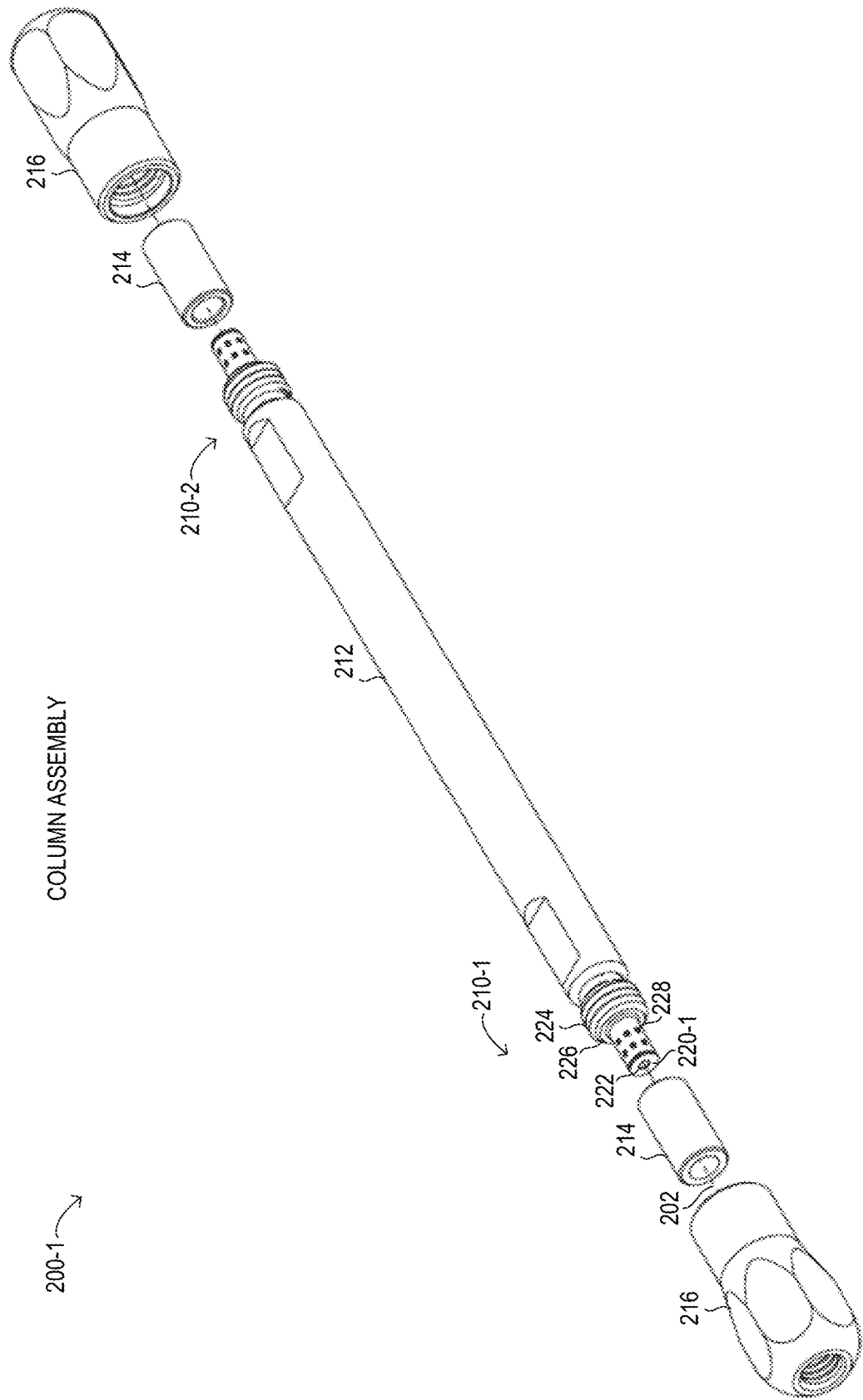
FIG. 2 depicts an exploded perspective view of one embodiment of a column having a compression-limited assembly.

Referring now to FIG. 2, a column assembly 200-1 is shown in an exterior exploded perspective view. In particular, column assembly 200-1 may represent an embodiment of column assembly 120 shown previously in FIG. 1, and, as shown in FIG. 2, may include a column tube assembly 212, as well as compression-limiting fittings at each of the end portions 210 of column tube assembly 212. It is noted that, although column assembly 200-1 is shown with an identical configuration at both end portions 210-1 and 210-2 for descriptive purposes, it will be understood that one end portion 210 may be different from the other end portion in certain implementations. Accordingly, column assembly 200-1 may have at least one end portion 210 with a compression limiting fitting, as disclosed herein.

As shown in FIG. 2, end portion 210-1 may be representative for a given type of end portion of column assembly 200-1 and will be described in further detail, and is accordingly labeled in the drawing singularly for descriptive clarity. Accordingly, it will be understood that end portion 210-2, including components obscured from view in FIG. 2, may be identical to end portion 210-1 in particular implementations. As noted above, column tube assembly 212 comprises a column jacket tube having sufficient thickness to withstand very high pressure, such as the pressure ranges described previously with respect to UHPLC. The column jacket tube may be a microtube. Additionally as shown, column tube assembly 212 in column assembly 200-1 further comprises a column liner tube 220, of which a flange portion 220-1 is visible at end portion 210-1 (see also FIGS. 3, 4, and 5). It is noted that column liner tube 200 may be a microtube. Also visible at end portion 210-1 in FIG. 2 is inner diameter 222, which represents the column passageway for column assembly 200-1 having a centerline 202. It is noted that a cylindrical geometry about centerline 202 is shown and described herein for descriptive clarity, but it will be understood that different geometries and shapes for the passageway of inner diameter 222 may be used. In particular embodiments, inner diameter 222 may be less than or equal to about 10 mm, less than or equal to about 5 mm, less than or equal to about 3 mm, less than or equal to about 2 mm, or less than or equal to about 1 mm. It is noted that microtubes are generally referred to herein as having an inner diameter of less than about 2 mm. Thus, when implemented with microtube dimensions, column assembly 200-1 may have inner diameter 222 of less than or equal to 2 mm, such as 1 mm or smaller.

Column liner tube 220 may be formed from a biocompatible material, such as a polymer. In various embodiments, the biocompatible material used to form column liner tube 220 may comprises at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE). The biocompatible material may further comprise a filler in certain implementations. For example, the filler may include at least one type of fiber, such as carbon fibers, nanofibers, and metallic fibers.

Additionally visible at end portion 210-1 of column assembly 200-1 is a threaded tube portion 224 terminating in a shoulder 226 that enables compression limiting of the end fitting, as will be described in further detail below. In the particular implementation shown in FIG. 2, end portion 210-1 also includes a frit retainer 214 that is configured to hold a frit (not visible in FIG. 2, see FIGS. 3, 4, 5) that can prevent the stationary phase (i.e., packed particles) from escaping, such as after packing or filling. Finally, also visible in FIG. 2 is a retainer body 216 that is formed as a hollow metallic nut with interior threading that mates with threaded tube portion 224. As described herein, end portion 210 may accordingly represent the end fitting associated with column tube assembly 212.

In operation, column assembly 200-1 may be prepared for use in an LC system, such as LC system 100 in FIG. 1. The preparation may involve introducing the desired packing material within inner diameter 222 of column tube assembly 212. In order to seal column tube assembly 212 at one end, frit retainer 214 populated with a frit may be introduced over end portion 210-1 of column tube assembly 212, and retainer body 216 may be threaded onto threaded tube portion 224. Additionally, a corresponding compression fitting for a tube (such as tube 103), such as a flat-bottom compression fitting, for an external tube (not shown in FIG. 2, see FIG. 1) may be inserted into an opposing end of retainer body 216, and also threadingly sealed (see also FIG. 3).

As retainer body 216 and threaded tube portion 224 threadingly mate, frit retainer 214 is pushed against shoulder 226 and is detained at precisely the position where flange portion 220-1 seals with a cavity in frit retainer 214. In this manner, the precise dimensions of retainer body 216, fit retainer 214, and threaded tube portion 224, including shoulder 226, may cause column tube assembly 212 to be detained in retainer body 216 at the desired position and with the desired compression to seal end portion 210-1 to a desired pressure (such as a very high pressure), but without excessive compression that may damage flange portion 220-1 (of column liner tube 220), frit retainer 214, or another component at end portion 210-1. In addition to the seal at flange portion 220-1, a secondary seal may be realized at shoulder 226 (see also FIG. 4).

Figure 3:
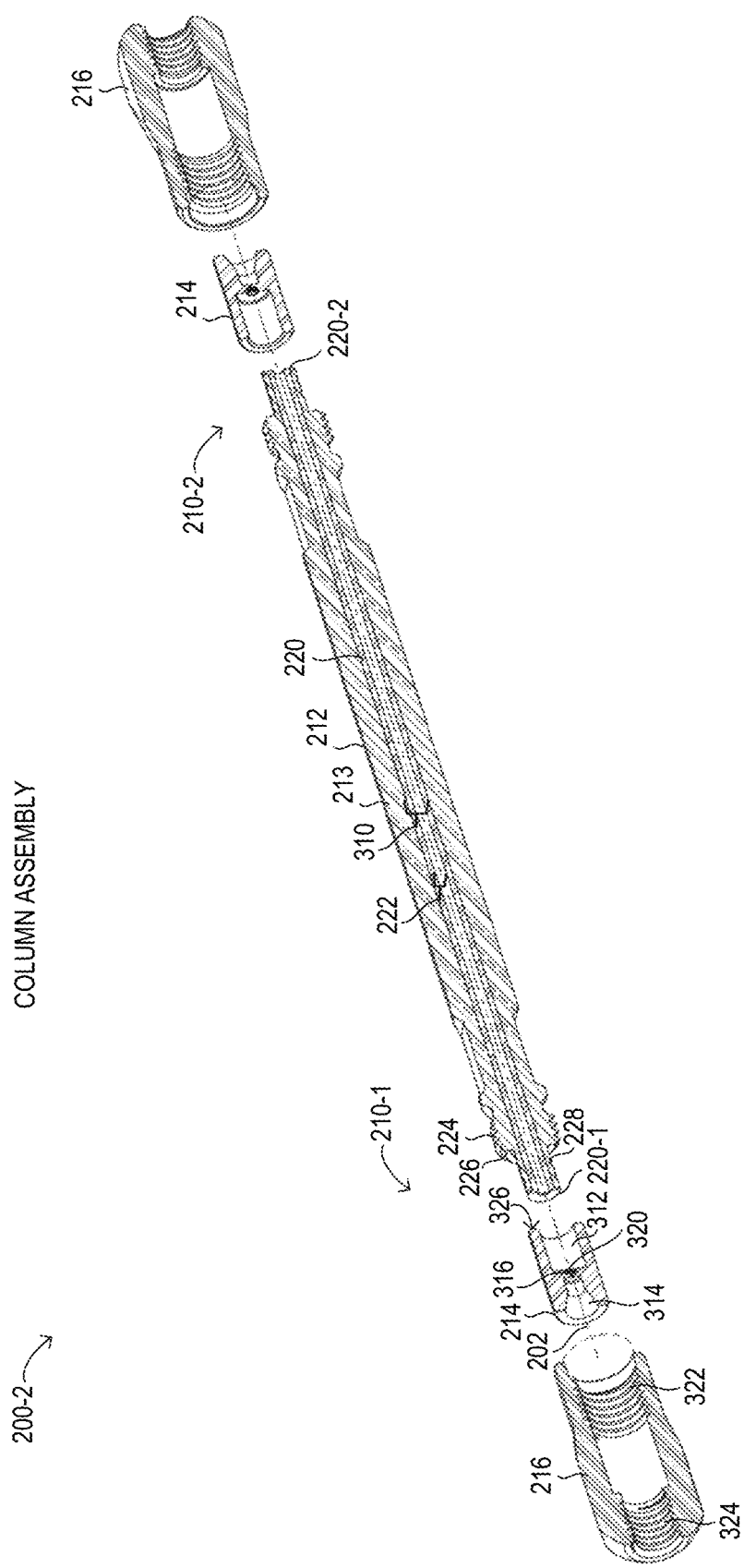
FIG. 3 depicts an exploded sectional perspective view of one embodiment of a column having a compression-limited assembly.

Referring now to FIG. 3, column assembly 200-2 is shown in a sectional exploded perspective view. In particular, column assembly 200-2 in FIG. 3 may represent a substantially similar embodiment of column assembly 200-2 shown previously in FIG. 2, but with a sectional view to expose certain interior components that are not visible in FIG. 2. As with FIG. 2, although column assembly 200-2 is shown with an identical configuration at both end portions 210-1 and 210-2 for descriptive purposes, a first end portion 210-1 is labeled in detail in the drawing and is described below as a representative end portion 210 that may be used at one or more ends of column assembly 200.

Visible in FIG. 3 is column tube assembly 212 comprising a column jacket tube 213 having a first inner diameter 310, and column liner tube 220 having a second inner diameter 222. Accordingly, column liner tube 220 is disposed within column jacket tube 213, while second inner diameter 222 is smaller than first inner diameter 310. A relatively large thickness of the wall of column jacket tube 213, which is typically formed from a metal, such as a stainless steel, is also now observable in FIG. 3, and shows that column tube assembly 212 is suited for very high pressure. As noted previously, second inner diameter 222 may be less than about 5 mm, less than about 2 mm, and may be less than about 1 mm in particular embodiments. Also visible in FIG. 3 is the extent of column liner tube 220, from flange portion 220-1 at first end portion 210-1 to flange portion 220-1 at second end portion 210-2. Also visible in FIG. 3 are threaded tube portion 224 and shoulder 226 at first end portion 210-1, along with dimples 228 that may be applied to compress and retain column liner tube 220 within column jacket tube 213.

Additionally in FIG. 3, interior details of frit retainer 214 can be seen in the sectional view. Specifically, frit retainer is formed with a first cavity 312 at a first end for receiving column tube assembly 212 and is shaped to mate with the tip of column tube assembly 212 where flange portion 220-1 provides a face seal having an 'O' shape. A second cavity 314 is formed at a second opposing end of frit retainer 214 and is shaped to receive a corresponding tube fitting, such as a cone-shaped tube fitting having a flat-bottom (not shown). It will be understood that second cavity 314 may be formed with various shapes to respectively receive various different types of tube fittings in different implementations. At the bottom of first cavity 312, a third cavity 316 is formed in frit retainer 214 and is populated with a frit 320. Additionally, a shoulder 326 is defined as a mating surface for shoulder 226 and represents the edge of first cavity 312 at the first end of frit retainer 320 (see also FIGS. 4, 5, and 6).

Furthermore in FIG. 3, a cross-section of retainer body 216 is visible, showing two different threaded portions, a column threaded portion 322 and a fitting threaded portion 324. As shown, column threaded portion 322 has female threads to correspondingly mate with the male threads of threaded tube portion 224. It will be understood that the threading configuration may be reversed (see also FIG. 5, column assembly 501) in particular implementations. Also, fitting threaded portion 324 has female threads to receive a male threaded tube fitting (not shown). It is noted that column threaded portion 322 and fitting threaded portion 324 may be independently threaded from each other with respect to size, pitch, run, direction, etc.

In operation of column assembly 200-2, and in particular at end portion 210-1, the operation of the end fitting is visible, showing how frit retainer 214 is captured and enclosed by retainer body 216 to engage column tube assembly 212, and specifically, to be detained by shoulder 226. Also, retainer body 216 is enlarged and formed as a hex nut to facilitate ease of manual handling and operation, but with the ability to use a tool, such as a wrench or socket, as desired, for tightening and loosening.

Figure 4:
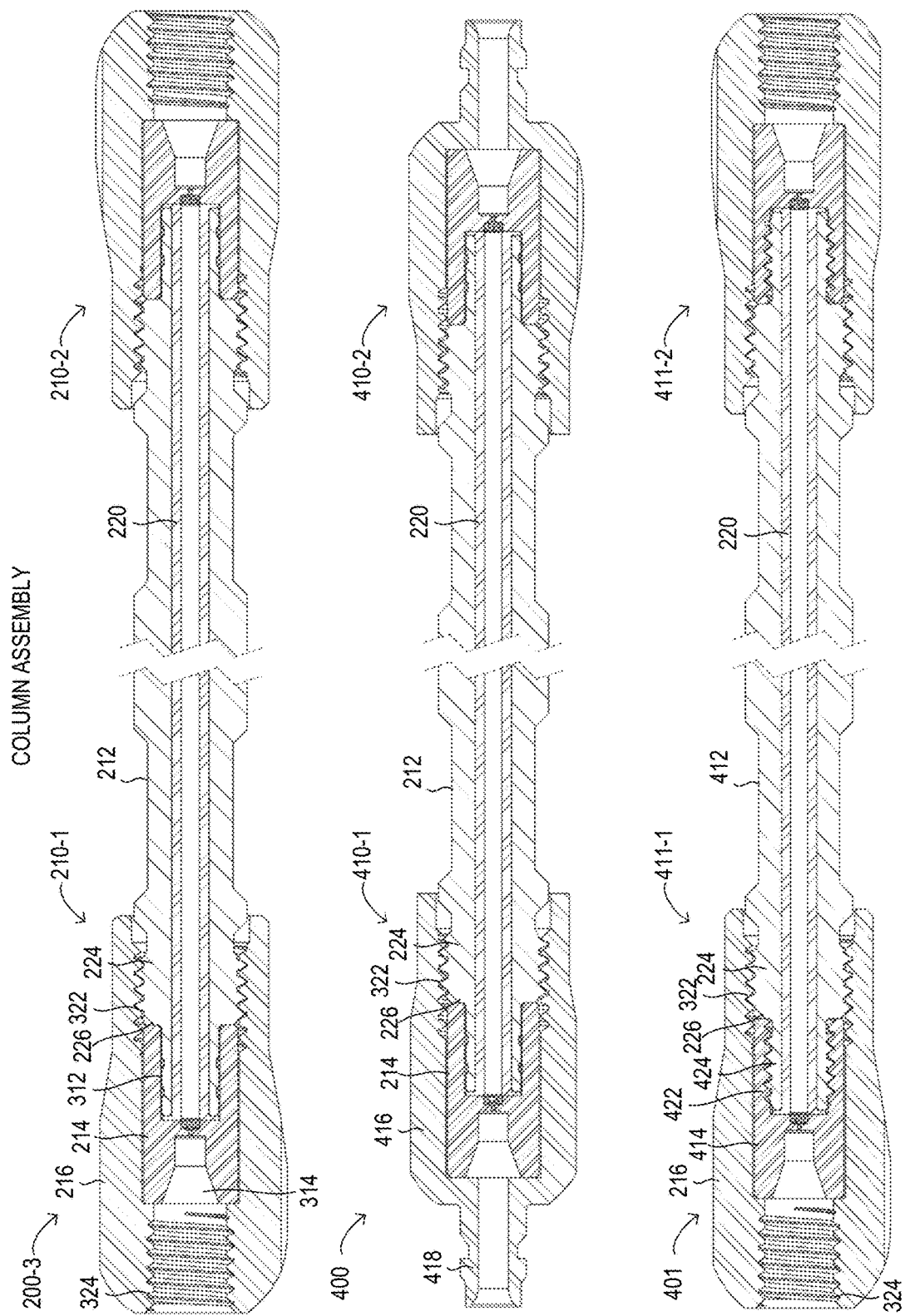
FIG. 4 depicts sectional views of three different embodiments of a column having a compression-limited assembly.

Referring now to FIG. 4, additional variants of the column assembly disclosed herein are shown in sectional views. In particular, column assembly 200-3 in FIG. 4 may represent a substantially similar embodiment of column assembly 200 shown previously in FIGS. 2 and 3, while column assemblies 400 and 401 in FIG. 4 are different embodiments. As with FIGS. 2 and 3, although column assemblies 200-3, 400, 401 are shown with an identical configuration at both end portions for descriptive purposes, a first end portion 210-1, 410-1, 411-1 respectively is labeled in detail in the drawing and is described below as a representative end portion that may be applied to one or more ends of column assemblies 200, 400 and 401, as desired. In particular, FIG. 4 shows sectional views of column assemblies in a sealed configuration with a frit at each ends of the column.

In FIG. 4, column assembly 200-3 is shown in a sectional view assembled, but without tube fittings that establish fluid communication with a chromatography system, such as LC system 100 in FIG. 1. Specifically, visible in column assembly 200-3 is frit retainer 214 enclosed within retainer body 216, and detained at the first end, at first cavity 312 by shoulder 226 of column tube assembly 212, and detained at the second end, at second cavity 314, by engagement of threaded tube portion 224 that threadingly mates with column threaded portion 322. Also visible are threaded tube portion 224 of column tube assembly 212, as well as column threaded portion 322 of retainer body 216, which are fully mated with each other. As is evident from first cavity 312, flange portion 220-1 is perfectly seated about a frit and, as a result of the specific dimensions of column tube assembly 212, frit retainer 214, and retainer body 216, is subject to a desired compression due to the axial translation limit provided by frit retainer 214. In addition to the high pressure or very high pressure seal at flange portion 220-1, it will be evident from column assembly 200-3 that a secondary seal is also formed at shoulder 226 that may further mitigate any potential leaks or pressure loss. In operation, an operator may tighten retainer body 216 using column threaded portion 322 until a hard stop occurs when frit retainer 214 meets shoulder 226, and no further tightening is possible against column tube assembly 212. Then, fitting threaded portion 324 may be independently used to tighten a tube fitting (not shown) to connect to a chromatography system, such as LC system 100 in FIG. 1.

In FIG. 4, column assembly 400 is shown in a sectional view assembled, but without tube fittings that establish fluid communication with a chromatography system, such as LC system 100 in FIG. 1. Specifically, visible in column assembly 400 are the same interior components as shown above with respect to column assembly 200-3 with regard to the connection of a retainer body 416 to column tube assembly 212 with compression limiting, as described previously. However, instead of a fitting threaded portion 324, retainer body 416 has a plug-in quick connector 418 to connect to a chromatography system, such as LC system 100 in FIG. 1. It will be understood that plug-in quick connector 418, shown as a nipple or a male connector, is intended to mate with a corresponding plug-in quick connector port or socket, or female connector (not shown). It will also be understood that the female plug-in quick connector may be implemented in different embodiments of retainer body 416.

In FIG. 4, column assembly 401 is shown in a sectional view assembled, but without tube fittings that establish fluid communication with a chromatography system, such as LC system 100 in FIG. 1. Specifically, visible in column assembly 401 is the same retainer body 216 as shown above with respect to column assembly 200-3. However, in column assembly 401, instead of frit retainer 214 and column tube assembly 212, a frit retainer 414 with a column tube assembly 412 is used at end portion 411-1. Frit retainer 414 is substantially similar to frit retainer 214, and column tube assembly 412 is substantially similar to column tube assembly 212, with the difference that frit retainer 414 has additional female threads 414 formed therein that mate with male threads 424 formed at a tip of column tube assembly 412. The threads 422/424 may be co-threaded with column threaded portion 322 and threaded tube portion 224, or may be different. With the arrangement depicted in column assembly 401, frit retainer 414 may be independently secured to microtube 414, which may be desirable for preparation of microtube 414 prior to use in a chromatography system, and subsequent connection using retainer body 216. It is further noted that frit retainer 414 may be rotationally detained when seated in retainer body 216, for example, by using a radial detention element, such as a notch, a groove, a keyway, or a flat (not shown).

Figure 5:
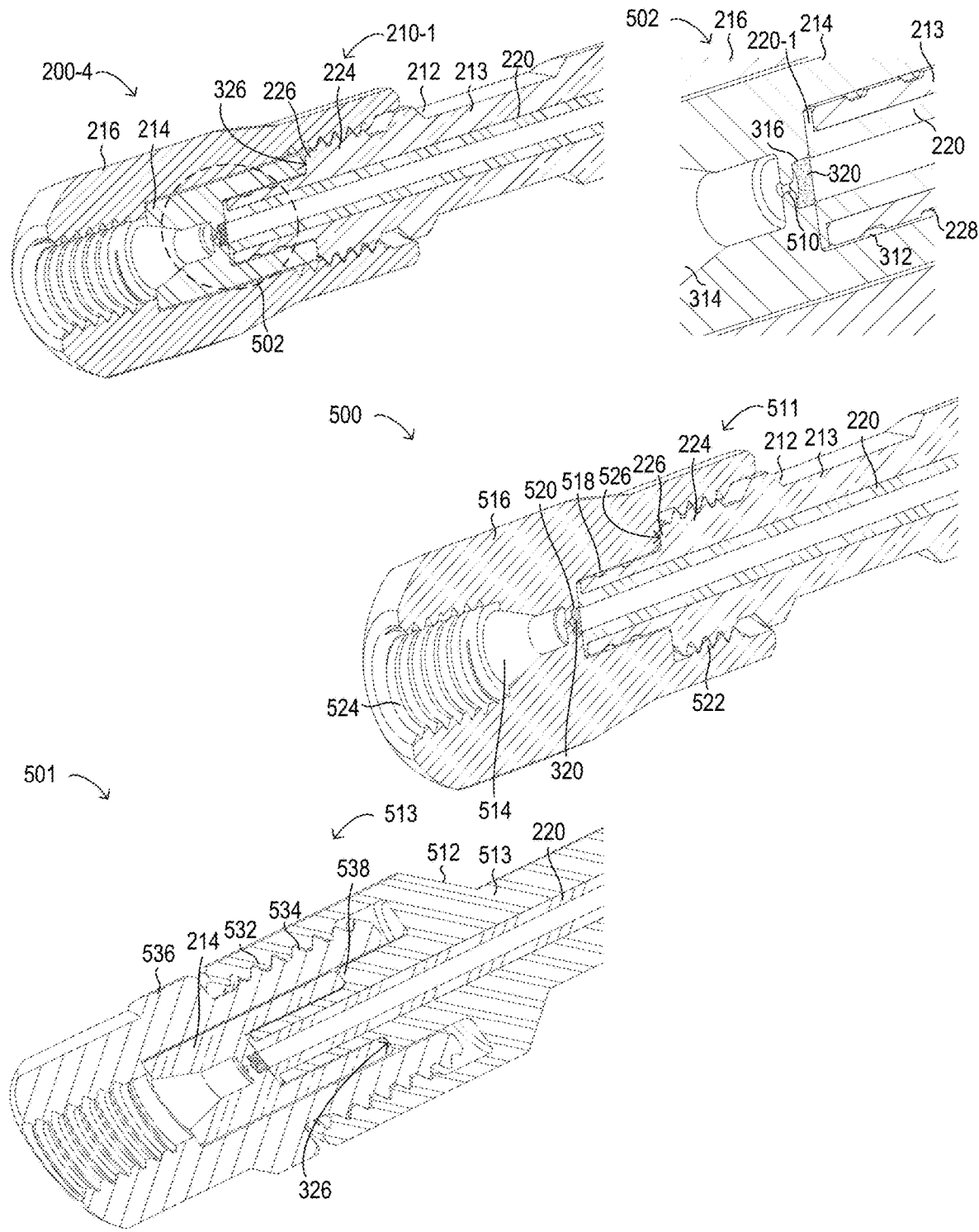
FIG. 5 depicts sectional perspective views of three different embodiments of end portions of a column having a compression-limited assembly.

Referring now to FIG. 5, various end portions of a column assembly disclosed herein are shown in sectional perspective views. In particular, column assembly 200-4 in FIG. 5 may represent a substantially similar embodiment of column assembly 200 shown previously in FIGS. 2, 3, and 4, while column assemblies 500 and 501 in FIG. 5 are different embodiments. In FIG. 5, column assemblies 200-4, 500, 501 are shown with corresponding first end portions 210-1, 511, and 513. It will be understood that the depicted end portions in FIG. 5 are representative end portions that may be applied to one or more ends of column assemblies 200, 400, 401, 500, and 501, as desired. In particular, FIG. 5 shows sectional perspective views of column assemblies in a sealed configuration with a frit.

In FIG. 5, as noted above, column assembly 200-4 is substantially similar to column assemblies 200 described previously herein, and is shown including column tube assembly 212 that comprises column liner tube 220 and column jacket tube 213. However, in column assembly 200-4, a section 502, including flange portion 220-1 and a fit 320, is shown in greater detail with higher magnification to the right. Visible in section 502 is third cavity 316 that is formed in frit retainer 214 to receive and hold frit 320. Thus, third cavity 316 may prevent frit 320 from moving and may ensure that fluid communication with inner diameter 322 of column liner tube 220 is maintained. In particular embodiments, frit 320 may be a dimpled frit having a recessed flow dispersion region in the form of a dimple at one side that allows for an increase in surface area. The increased surface area, for example when subjected to an inlet flow stream, may increase an effective exposed surface area to the flow, which may increase the tolerance of the frit to clogging. In particular embodiments, frit 320 may be made from stainless steel and may have porosity. For example, frit 320 may be made using a metal foam, such as a nanoparticle or microparticle metal foam. For improved biocompatibility, certain embodiments may use a polymer frit made from a biocompatible material (see also FIG. 6). Also visible in section 502 is a passageway 510, which enables fluid communication between first cavity 312 and second cavity 314 in frit retainer 214. In particular, the sealing of first cavity 312 by flange portion 220-1 is also shown in greater detail in section 502.

In FIG. 5, column assembly 500 is shown in a sectional perspective view assembled, but without tube fittings that establish fluid communication with a chromatography system, such as LC system 100 in FIG. 1. Specifically, visible in column assembly 500 is column tube assembly 212 comprising column jacket tube 213 and column liner tube 220. However, in column assembly 500, instead of retainer body 216 and frit retainer 214, an integral retainer body 516 is shown. Integral retainer body 516 is configured to operate substantially similarly to the combination of retainer body 216 and frit retainer 214 described with respect to column assembly 200, but without a separate frit retainer. Instead, certain features of frit retainer 214 have been formed directly within integrated retainer body 516. In particular, a tube cavity 518 is directly formed in integrated retainer body 516 to receive the tip of column tube assembly 212. Within tube cavity 518, a frit cavity 520 is formed to hold frit 320. Integrated retainer body 516 has a column threaded portion 522 that is substantially similar to column threaded portion 322, and operates to threadingly mate with threaded tube portion 224 to seal flange portion 220-1 against a bottom of tube cavity 518, while a shoulder 526 in integrated retainer body 516 detains shoulder 226 in a similar manner as shoulder 326 in frit retainer 214. Similarly, a second cavity 514 in integrated retainer body 516 is substantially similar to second cavity 314 in frit retainer 214. Additionally, a fitting threaded portion 524 in integrated retainer body 516 is substantially similar to fitting threaded portion 324 in frit retainer 214.

In FIG. 5, column assembly 501 is shown in a sectional perspective view assembled, but without tube fittings that establish fluid communication with a chromatography system, such as LC system 100 in FIG. 1. Specifically, visible in column assembly 501 is a column tube assembly 512 comprising a column jacket tube 513 and column tube liner 512. Furthermore, in column assembly 501, column liner tube 220 mates with a retainer body 536. As with column assembly 200 described previously, column assembly 501 includes frit retainer 214 that operates in a substantially similar manner. However, in column assembly 501, instead of threaded tube portion 224 having male threads and column threaded portion 322 having female threads, column tube assembly 512 has female threads 532, while retainer body 536 has corresponding male threads 534, as shown. Furthermore, as shown, column tube assembly 512 has a shoulder 538 in place of shoulder 226 that is detained by shoulder 326 of frit retainer 214.

Figure 6:
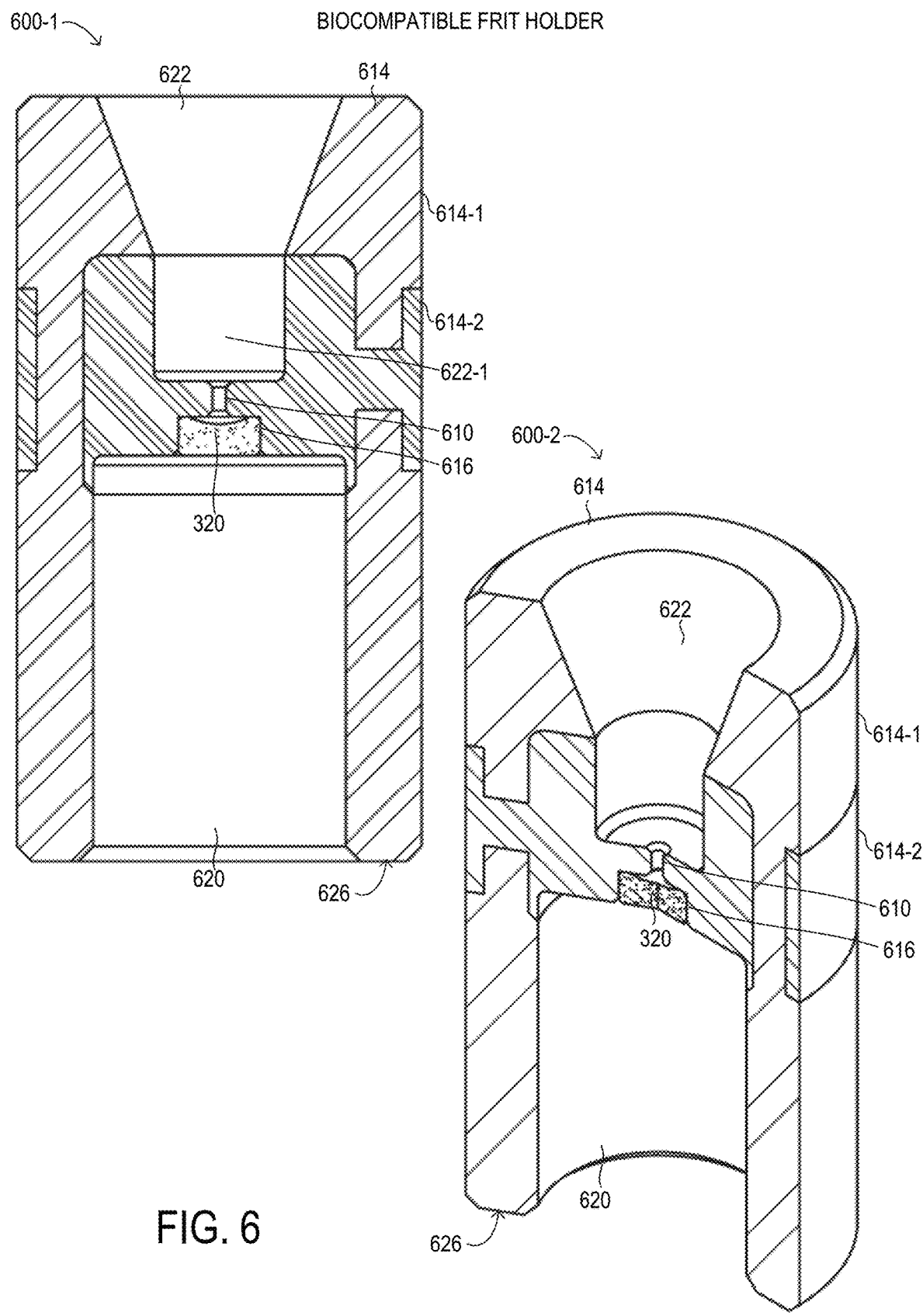
FIG. 6 depicts a sectional view and a sectional perspective view of a biocompatible frit holder.

Referring now to FIG. 6, a biocompatible frit retainer 600 is shown in a sectional view as 600-1 and in a sectional perspective view as 600-2. In FIG. 6, biocompatible frit retainer 600 may operate and be used in a substantially similar manner as previously described with respect to frit retainer 214. However, as shown in FIG. 6, biocompatible frit retainer 600 comprises a frit retainer body 614 that is formed in two sections 614-1 and 614-2, which may be bonded together to form biocompatible frit retainer 600. An outer section 614-1 may be formed from a metal, while a central section 614-2 may be formed from a biocompatible material, such as a polymer used to form column liner tube 220 described above. In various embodiments, central section 614-2 may be formed using a biocompatible material that comprises at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

In biocompatible frit retainer 600, a first cavity 620 may correspond to first cavity 312 in frit retainer 214, a second cavity 622 may correspond to second cavity 314 in frit retainer 214, and a third cavity 616 to hold frit 320 may correspond to third cavity 316 in frit retainer 214. The two sections 614-1 and 614-2 may be co-molded together in particular implementations, for example by insert injection molding of central section 614-2 using a polymer into outer section 614-1 formed from a metal. In various implementations, sections 614-1 and 614-2 may be bonded together using any suitable method, such as using adhesive, pressure, temperature, ultrasonic welding, using fasteners, or another suitable bonding process.

As shown in FIG. 6, central section 614-2 of biocompatible frit retainer 600 is located where exposure of the fluid connection may occur, specifically, at bottom portions of first cavity 620 and second cavity 622, where the mobile phase flows and may be exposed to fit retainer body 614. Central section 614-2 of biocompatible frit retainer 600 also includes a passageway 610 that corresponds to passageway 510 in frit retainer 214 that is exposed to the mobile phase. In particular embodiments, frit 320 itself may be made using a biocompatible polymer that comprises at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

Referring now to FIGS. 7A, 7B, and 7C, flowcharts of selected elements of an embodiment of a method 700 for manufacturing a column having a compression-limited assembly, as disclosed herein, is depicted. In FIG. 7A, method 700-1 comprising steps 710 through 720 describe a method of manufacturing a column tube assembly of the column assembly. In FIG. 7B, method 700-2 comprising steps 722 and 724 describes additional operations to method 700-1 to form compression-limited fittings, such as shown with respect to column assemblies 200, 400, 401, and 501 (see FIGS. 2, 3, 4, and 5). In FIG. 7C, method 700-3 comprising step 730 describes additional operations to method 700-1 to form a compression-limited fitting shown with respect to column assembly 500 and having functionality of the frit retainer integrally formed in retainer body 516 (see FIG. 5). It is noted that certain operations described in method 700 may be optional or may be rearranged in different embodiments.

Method 700-1, may begin, at step 710 by using computer numerical controlled (CNC) machining to form a metal column jacket tube for use as a chromatography column enabled to separate molecular species in a mobile phase and having a first inner diameter less than about 5 mm, and including a threaded tube portion at least one end to threadingly engage with a retainer body at the at least one end, where the threaded tube portion includes a shoulder that detains the column jacket tube in the retainer body. At step 712, a polymer tube comprised of a biocompatible polymer is extruded to a first outer diameter greater than the first inner diameter of the column jacket tube. At step 714, the polymer tube is cold drawn through a die at room temperature to reduce the first outer diameter to a second outer diameter that is less than the first inner diameter of the column jacket tube, to create a column liner tube. At step 716, the column liner tube is inserted into the column jacket tube, where the column liner tube extends beyond both ends of the column jacket tube. It is noted that the column liner tube may be sufficiently stiff, or may be made sufficiently stiff, for insertion into the column jacket tube at step 716. At step 718, the column liner tube is secured in the column jacket tube, where the column liner tube is configured to cylindrically cover the first inner diameter of the column jacket tube and the column liner tube has a second inner diameter less than the first inner diameter of the column jacket tube, where the second inner diameter defines a column passageway enabled to receive a stationary phase and a mobile phase and to isolate the mobile phase from contact with the column jacket tube. At step 720, at least one end of the column liner tube is flared to form a flange portion that radially covers the at least one end of the column jacket tube. The flaring operation in step 720 may be performed using more than one step. For example, a first partial flaring may be performed with or without a mandrel, and a second flaring may be performed without the mandrel to generate a flat flange portion. After step 720, method 700-1 may proceed to method 700-2 in FIG. 7B, by proceeding to step 722, or may proceed to method 700-3 in FIG. 7B by proceeding to step 730.

In FIG. 7B, method 700-2, may begin, at step 722 by forming a frit retainer enabled to receive the end of the column jacket tube, such that the frit retainer is configured to mate with the shoulder at a first end and to mate with a second cavity in the retainer body at a second end, the frit retainer further comprising a first cavity at the first end configured to receive the end of the column jacket tube radially covered by the flange portion of the column liner tube. At step 724, retainer body enabled to threadingly engage the threaded tube portion with the retainer body is formed, such that the flange portion fluidically seals the column jacket tube against the first cavity, and where the frit retainer is enclosed by the retainer body.

In FIG. 7C, method 700-3, may begin, at step 730 by forming the retainer body enabled to threadingly engage the threaded tube portion with the retainer body, and enabled to receive the end of the column jacket tube radially covered by the flange portion of the column liner tube at a first cavity, such that the retainer body is configured to mate with the shoulder at a first end, and the flange portion fluidically seals the column jacket tube against the first cavity, the retainer body further comprising a second cavity at a second end.

It will be understood that the current disclosure provides a column having a compression-limited assembly that can withstand the fluid pressures required for UHPLC, among other chromatography applications. It will also be understood that the microtube and microtube assemblies shown and disclosed herein may be used for fluid connections in systems transporting small volumes of a fluid at high pressures. For example, the tubing in accordance with the present disclosure may have an outside diameter (OD) in the range of from about 400 microns to about 6,400 microns (about 1/64 inches to about 1/4 inch), or about 400, 800, 1600, 3200, 6400 microns (about 1/64, 1/32, 1/16, 1/8 or 1/4 of an inch) in diameter inclusive, and may have an inner diameter (ID) of from about 25 microns to about 2200 microns (about 0.001 to about 0.085 inches), or about 25, 50, 150, 250, 375, 500, 625, 750, 1500, 2200 microns (0.001, 0.002, 0.006, 0.010, 0.015, 0.020, 0.025, 0.030, 0.060, or 0.085 inches), inclusive. Moreover, the microtube assemblies described and shown in this disclosure may be capable of pressures greater than about 280,000 kPa (or 40,000 psi) using the compression-limited fittings described herein. The assemblies described herein may also be durable and capable of multiple connection uses prior to failure. Various components disclosed herein are described as being formed from a metal, such as stainless steel. For example, column tube assembly 212 may comprise a first metal, while frit retainer 214 may comprise a second metal, and retainer body 216 may comprise a third metal. At least one of the first metal, the second metal, and the third metal may be a stainless steel selected from UNS S31600, UNS S31603, Nitronic 60, or an austenitic alloy comprising, in order of composition, the elements Fe, Cr, Mn, Ni, Si. N, and C.

As disclosed herein, a chromatography column has a column assembly that further includes a column jacket tube and a column liner tube. The column assembly is configured with end fittings that have compression limiting features and are able to withstand very high pressure, such as used in UHPLC, in conjunction with flange portions of the column liner tube that seal the column assembly. The column liner tube may be biocompatible and may have a smooth consistent inner diameter of less than 2 mm, and an inner diameter of 1 mm in particular embodiments. The end fittings for the microtube assembly may ensure durability and reliability by preventing over- or under-tightening.

While the present disclosure has been shown and described in various embodiments, it will be understood from the drawings and the foregoing discussion that various changes, modifications, and variations may be made without departing from the spirit and scope of the invention as set forth in the claims. For example, the shapes, sizes, features, and materials of the fitting assembly, fluid connection, and/or analytical instrument systems of the present disclosure may be changed. Hence, the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

What is claimed is:

1. A column assembly for chromatography, the column assembly comprising: a column jacket tube and a column liner configured for use as a column, wherein the column jacket tube comprises a first portion having a first outside diameter, a first metal, and has a first inner diameter less than 5 mm, the column jacket tube further comprising an end portion at one end configured to removably receive a retainer body enabled for fluid communication with the column liner, the column jacket tube further comprising a threaded tube portion at one end of the column jacket tube, the threaded tube portion configured to threadingly engage with an end fitting, wherein the threaded tube portion further comprises a shoulder that detains the retainer body when the threaded tube portion is engaged with the end fitting;

a column liner tube configured to cylindrically cover the first inner diameter of the column jacket tube and having a second inner diameter less than the first inner diameter, wherein the second inner diameter defines a column passageway enabled to receive a stationary phase and a mobile phase, and to isolate at least the mobile phase from contact with the column jacket tube, wherein the column liner tube is formed from a biocompatible material and the column tube liner further integrally comprises a flange portion that radially covers the one end of the column jacket tube; and a removable frit retainer configured to mate with the shoulder at a first end and to mate with a second cavity in the retainer body at a second end, the frit retainer comprising a first cavity at the first end configured to receive the end of the column jacket tube radially covered by the flange portion of the column liner tube, a central opening for removably receiving the shoulder, a passageway therethrough, and a third cavity configured to removably receive and hold a frit, wherein, when the threaded tube portion threadingly engages with the retainer body, the flange portion engages with the central opening to fluidically seal the column liner tube against the first cavity, wherein the frit retainer is enclosed by the retainer body.

2. The column assembly of claim 1, wherein, when the threaded tube portion threadingly engages with the retainer body, the shoulder is configured for detention contact with the frit retainer to limit a compression force applied by the retainer body to the column liner tube.

3. The column assembly of claim 2, wherein the compression force is specified to provide a high pressure fluidic seal by compressing the flange portion against the first cavity.

4. The column assembly of claim 3, wherein the high pressure fluidic seal is enabled to seal the column passageway up to 280,000 kPa.

5. The column assembly of claim 3, wherein the shoulder in detention contact with the frit retainer forms a secondary seal in addition to the high pressure fluidic seal.

6. The column assembly of claim 1, further comprising: a third cavity disposed within the first cavity, the third cavity configured to receive and hold a frit in fluid communication with the column passageway at the flange portion.

7. The column assembly of claim 6, wherein the frit is a dimpled frit having an increased inlet surface area.

8. The column assembly of claim 7, wherein the dimpled frit comprises a porous metal.

9. The column assembly of claim 8, wherein the porous metal is a metal foam.

10. The column assembly of claim 1, wherein the retainer body encloses the frit retainer.

11. The column assembly of claim 1, wherein the threaded tube portion has male threading and the retainer body has female threading that threadingly engage together.

12. The column assembly of claim 1, wherein the threaded tube portion has female threading and the retainer body has male threading that threadingly engage together.

13. The column assembly of claim 1, wherein the frit retainer comprises a second metal, and the retainer body comprises a third metal.

14. The column assembly of claim 13, wherein at least one of the first metal, the second metal, and the third metal comprise a stainless steel.

15. The column assembly of claim 14, wherein the stainless steel is an austenitic alloy comprising, in order of composition, the elements Fe, Cr, Mn, Ni, Si, N, and C.

16. The column assembly of claim 1, wherein the biocompatible material comprises at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

17. The column assembly of claim 16, wherein the biocompatible material further comprises a filler.

18. The column assembly of claim 17, wherein the filler further comprises at least one type of fiber.

19. The column assembly of claim 18, wherein the type of fiber is selected from at least one of: carbon fibers, nanofibers, and metallic fibers.

20. The column assembly of claim 6, wherein the frit retainer further comprises two sections including an outer section corresponding to the first and second ends and a middle section, wherein the outer section is formed from a unitary workpiece, wherein the middle section includes a bottom of the first cavity, the third cavity, and a frit passageway in fluid communication with the retainer body, and wherein the middle section is formed from a biocompatible polymer.

21. The column assembly of claim 1, wherein the column jacket tube further comprises a threaded tip portion and the first cavity of the frit retainer is correspondingly threaded to mate with the threaded tip portion.

22. The column assembly of claim 21, wherein the frit retainer is detained from rotating in the retainer body.

23. The column assembly of claim 1, wherein an external port of the retainer body is a flat-bottom port for receiving a threaded flat-bottom port fitting.

24. The column assembly of claim 1, wherein an external port of the retainer body is compatible with a plug-in quick connect fitting.

25. The column assembly of claim 24, wherein the external port of the retainer body is a nipple for the plug-in quick connect fitting.

26. The column assembly of claim 1, wherein the first inner diameter is less than 4 mm.

27. The column assembly of claim 1, wherein the first inner diameter is less than 3 mm.

28. The column assembly of claim 1, wherein the second inner diameter is less than 3 mm.

29. The column assembly of claim 1, wherein the second inner diameter is less than 2 mm.

30. A chromatography column assembly, comprising: a column jacket tube and a column liner, the column jacket tube comprising a first material and having a first inner diameter and a first outside diameter, the column jacket tube further comprising an end portion at one end configured to removably receive a retainer body enabled for fluid communication with the column liner, the column jacket tube further comprising a threaded tube portion at one end of the column jacket tube, the threaded tube portion configured to threadingly engage with an end fitting, wherein the threaded tube portion further comprises a shoulder that detens the retainer body when the threaded tube portion is engaged with the end fitting;
- a column liner tube configured to cylindrically cover the first inner diameter of the column jacket tube and having a second inner diameter less than the first inner diameter, wherein the second inner diameter defines a column passageway enabled to receive a stationary phase and a mobile phase, and to isolate at least the mobile phase from contact with the column jacket tube, wherein the column liner tube is formed from a biocompatible material and the column tube liner further integrally comprises a flange portion that radially covers the one end of the column jacket tube; and
- a removable frit retainer configured to mate with the shoulder at a first end and to mate with a second cavity in the retainer body at a second end, the frit retainer further comprising a first cavity at the first end configured to receive and hold a fit in fluid communication with the column passageway at the flange portion, a central opening for removably receiving the shoulder, a passageway therethrough, and a third cavity configured to removably receive and hold a frit, wherein, when the threaded tube portion threadingly engages with the retainer body, the flange portion engages with the central opening to fluidically seal the column liner tube against the first cavity, wherein the frit retainer is enclosed by the retainer body.

31. The chromatography column assembly of claim 30, wherein the frit retainer further comprises a third cavity at the first end configured to receive the end of the column jacket tube radially covered by the flange portion of the column liner tube, wherein the first cavity is formed within the third cavity.

32. The chromatography column assembly of claim 31, wherein, when the threaded tube portion threadingly engages with the retainer body, the shoulder is configured for detention contact with the frit retainer to limit a compression force applied by the retainer body to the flange portion.

33. The chromatography column assembly of claim 32, wherein the compression force is specified to provide a high pressure fluidic seal by compressing the flange portion against the first cavity.

34. The chromatography column assembly of claim 33, wherein the high pressure fluidic seal is enabled to seal the column passageway up to 280,000 kPa.

35. The chromatography column assembly of claim 33, wherein the shoulder in detention contact with the frit retainer forms a secondary seal in addition to the high pressure fluidic seal.

36. The chromatography column assembly of claim 30, wherein the frit is a dimpled frit having an increased inlet surface area.

37. The chromatography column assembly of claim 36, wherein the dimpled frit comprises a porous metal.

38. The chromatography column assembly of claim 37, wherein the porous metal is a metal foam.

39. The chromatography column assembly of claim 30, wherein the retainer body encloses the frit retainer.

40. The chromatography column assembly of claim 30, wherein the threaded tube portion has male threading and the retainer body has female threading that threadingly engage together.

41. The chromatography column assembly of claim 30, wherein the threaded tube portion has female threading and the retainer body has male threading that threadingly engage together.

42. The chromatography column assembly of claim 30, wherein the frit retainer comprises a second metal, and the retainer body comprises a third metal.

43. The chromatography column assembly of claim 42, wherein at least one of the first material, the second metal, and the third metal comprise a stainless steel.

44. The chromatography column assembly of claim 43, wherein the stainless steel is an austenitic alloy comprising, in order of composition, the elements Fe, Cr, Mn, Ni, Si, N, and C.

45. The chromatography column assembly of claim 30, wherein the biocompatible material comprises at least one of: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxyethylene, a perfluoroalkoxy alkane (PFA), and polychlorotrifluoroethylene (PCTFE).

46. The chromatography column assembly of claim 31, wherein the frit retainer further comprises two sections including an outer section corresponding to the first and second ends and a middle section, wherein the outer section is formed from a unitary workpiece, wherein the middle section includes a bottom of the third cavity, the first cavity, and a frit passageway in fluid communication with the retainer body, and wherein the middle section is formed from a biocompatible polymer.

47. The chromatography column assembly of claim 31, wherein the column jacket tube further comprises a threaded tip portion and the third cavity of the frit retainer is correspondingly threaded to mate with the threaded tip portion.

48. The chromatography column assembly of claim 47, wherein the retainer body further comprises a detention feature for detaining the frit retainer from rotating in the retainer body.

49. The chromatography column assembly of claim 30, wherein an external port of the retainer body is a flat-bottom port for receiving a threaded flat-bottom port fitting.

50. The chromatography column assembly of claim 30, wherein an external port of the retainer body is compatible with a plug-in quick connect fitting.

51. The chromatography column assembly of claim 50, wherein the external port of the retainer body is a nipple for the plug-in quick connect fitting.

52. The chromatography column assembly of claim 30, wherein the first inner diameter is less than 4 mm.

53. The chromatography column assembly of claim 30, wherein the first inner diameter is less than 3 mm.

54. The chromatography column assembly of claim 30, wherein the second inner diameter is less than 3 mm.

55. The chromatography column assembly of claim 30, wherein the second inner diameter is less than 2 mm.

\* \* \* \* \*